United States Patent
Katsuda et al.

(10) Patent No.: US 6,906,819 B2
(45) Date of Patent: Jun. 14, 2005

(54) IMAGE FORMING DEVICE, A METHOD OF CONTROLLING IMAGE FORMING DEVICE, AND A COMPUTER PROGRAM PRODUCT FOR CONTROLLING IMAGE FORMING DEVICE AND PROVIDING LOCATION INFORMATION

(75) Inventors: Takeo Katsuda, Tokyo (JP); Takenori Idehara, Machida (JP)

(73) Assignee: Minolta Co., Ltd., Osaka (JP)

( * ) Notice: Subject to any disclaimer, the term of this patent is extended or adjusted under 35 U.S.C. 154(b) by 557 days.

(21) Appl. No.: 09/863,449

(22) Filed: May 24, 2001

(65) Prior Publication Data

US 2001/0048833 A1 Dec. 6, 2001

(30) Foreign Application Priority Data

May 25, 2000 (JP) ........................................ 2000-155324
Jun. 1, 2000 (JP) ........................................ 2000-164891

(51) Int. Cl.[7] .......................... G06F 15/16; G06K 15/00; G06K 15/02
(52) U.S. Cl. ....................................... 358/1.15; 709/201
(58) Field of Search .............. 700/99, 100; 358/1.1–1.9, 358/1.11–1.18, 449; 709/200, 201, 101, 104, 226

(56) References Cited

U.S. PATENT DOCUMENTS 5,287,194 A * 2/1994 Lobiondo ................... 358/1.15
6,369,914 B1 * 4/2002 Miura ........................ 358/403

FOREIGN PATENT DOCUMENTS

| JP | 10-319795 | 12/1998 |
| JP | 10-320341 | 12/1998 |
| JP | 10-320342 | 12/1998 |
| JP | 10-320344 | 12/1998 |
| JP | 10-333845 | 12/1998 |

* cited by examiner

Primary Examiner—King Y. Poon
(74) Attorney, Agent, or Firm—Burns, Doane, Swecker & Mathis, L.L.P.

(57) ABSTRACT

A printer 30a that was originally specified by the user Prints a transfer destination guide map, on which the location information of other printers is shown, when a portion or all of a print job is transferred to those other printers. The transfer destination guide map is further added with information useful for the user such as the expected time of completion for the print out, the number of printed sheets, and the route of pick up. The transfer destination guide map is insert-printed on the page position of the transferred page.

71 Claims, 31 Drawing Sheets

IMAGE FORMING DEVICE, A METHOD OF CONTROLLING IMAGE FORMING DEVICE, AND A COMPUTER PROGRAM PRODUCT FOR CONTROLLING IMAGE FORMING DEVICE AND PROVIDING LOCATION INFORMATION

This application is based on Japanese Patent Application Nos. 2000-155324 and 2000-164891 filed on May 25, 2000 and Jun. 1, 2000 respectively, the contents of which are hereby incorporated by reference.

BACKGROUND OF THE INVENTION

1. Field of the Invention

The present invention relates to an image forming device, a method of controlling an image forming device and a computer program product for controlling an image forming device.

2. Description of Related Art

As the scale of computer networks becomes larger, a type of network system is becoming popular in which multiple image forming devices such as printers and digital copying machines (descriptions of the invention will be made hereinafter using a printer as an example) are interconnected with each other through the network. In such a network system, a technology is known in which a portion of or all of the print jobs assigned to a printer are transferred to other printers. For example, a printer that receives a print job may transfer a portion of the print job to another printer to be printed by the latter on behalf of the former. As a result, the time required for completing the printing job can be shortened. Another example is where a printer that cannot produce color prints receives a job in which color image and monochromatic image pages are mixed, the printer separates color image pages from the rest of the job and sends those color pages to a printer that can produce color prints. Yet another example is where a printer runs out of a certain consumable item and consequently transfers a job to another printer so that the printing can be continued without interruption.

In the Publications of Unexamined Japanese Patent Applications Nos. H10-333845 and H10-319795, a technology is disclosed where the information of the location of a piece of equipment, which is the transfer destination of a print job as it is a device suited for the execution of the print job, is provided to a device such as a computer that ordered the print job, and the information is displayed with a map showing the location.

However, the technology disclosed by said publications has a shortcoming that it is necessary for the user to memorize or write down the location of the transfer destination so that the user can go to the transfer destination to pick up the printed pages. Also, if the system only notifies the computer that requested the print about the transfer location, the user may have difficulty finding the transfer destination as the printer may automatically separate the print and divert a portion of the print job to another printer after the user left the computer to pick up the print at the originally specified printer.

Moreover, if a print job is divided and another printer is printing a portion of the print job, it is difficult for the user to determine immediately which pages are transferred. In such a case, the user has to confirm the page locations of the transferred pages by checking the serial number of each page printed on the page. Finding the page locations of the transferred pages will be even more difficult if the serial numbers are not printed. Since it is so difficult to confirm the page locations of the transferred pages, the user may end up stacking up the printed pages in a wrong order.

SUMMARY OF THE INVENTION

It is an object of this invention to provide an image forming device, its control method and a computer program product that can eliminate the user's burden of memorizing or writing down the transfer target location and easily advise the user about the transfer destination even if a portion or all of a print job is automatically transferred to a printing device other than the one the user specified.

It is another object of this invention to provide an image forming device, its control method and a computer program product that can detect the transferred locations instantaneously to alleviate the user's burden of compiling the printed pages distributed among multiple devices.

According to an aspect of the invention, an image forming device connected to a network has an interface receiving a print job, a memory storing location information of one or more other devices connected with the image forming device via the network, a processor executing a process of transferring a portion of or all of the received print job to one or more transfer destinations that are included in the other devices, and a printing unit printing location information of the transfer destinations to which the print job is transferred.

According to another aspect of the invention, a control method for an image forming device connected to a network has a step of receiving a print job, a transfer step of transferring a portion or all of the received print job to one or more transfer destinations that are included in one or more other devices connected with the image forming device via the network, a step of accessing a memory, in which locations of the other devices are stored in advance, to acquire the location information of the transfer destinations to which the print job is transferred, a printing step of causing the image forming device to print the obtained location information of the transfer destinations.

According to still another aspect of the invention, a computer program product for controlling an image forming device connected to a network executes a procedure for receiving a print job, a transfer procedure for transferring a portion or all of the received print job to one or more transfer destinations that are included in one or more other devices connected with the image forming device via the network, a procedure for accessing a memory, in which locations of the other devices are stored in advance, to acquire the location information of said transfer destinations to which the print job is transferred, a printing procedure for causing said image forming device to print the obtained location information of the transfer destinations.

DESCRIPTION OF THE PREFERRED EMBODIMENTS

First Embodiment

Figure 1:
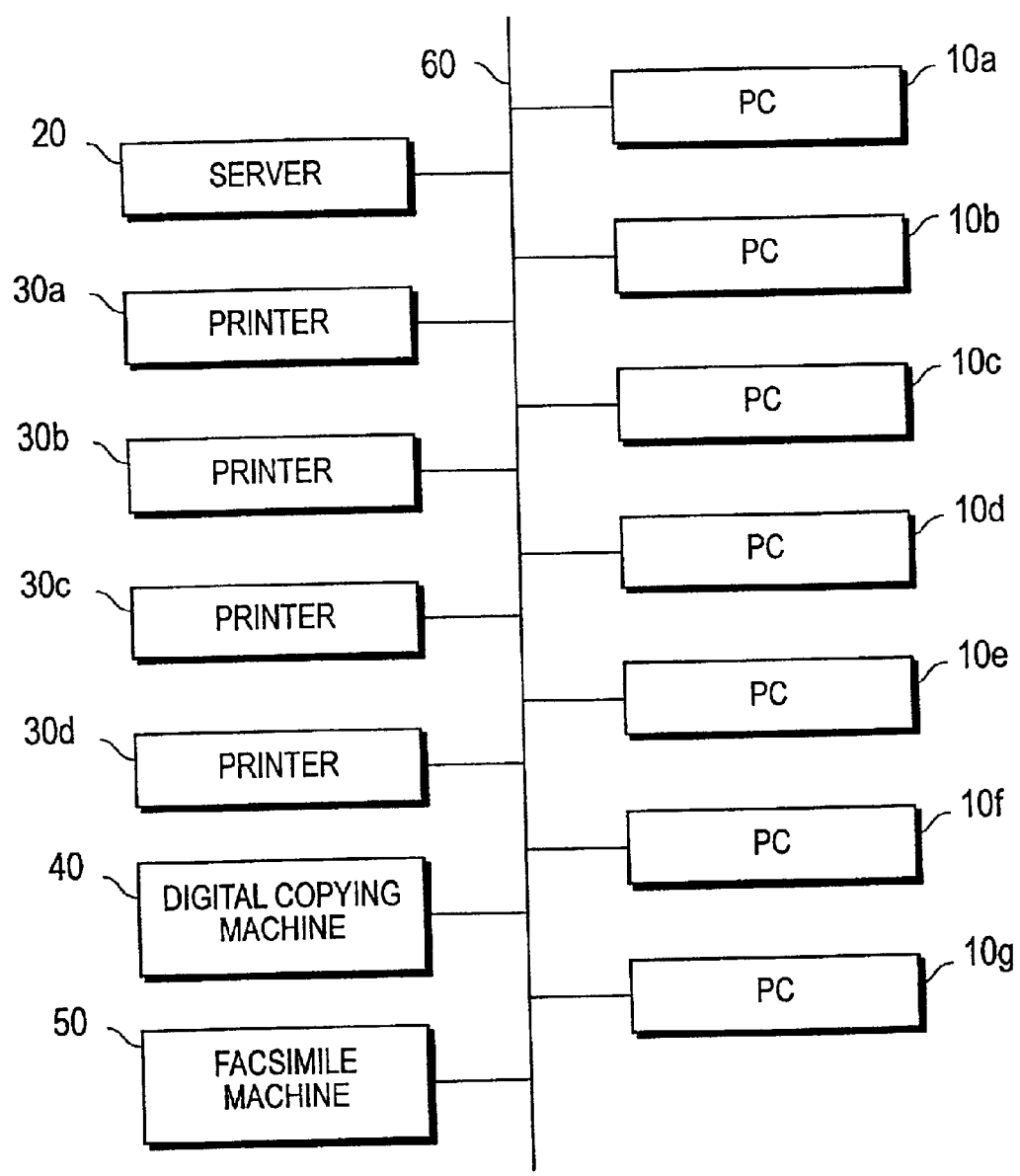
FIG. 1 shows an example a block diagram of a network system, which is an embodiment of this invention.

FIG. 1 shows an example constitution of a network system, which is a preferred embodiment of this invention.

In this network system, personal computers ("PC") 10a–10g, a server 20, printers 30a–30d, a digital copying machine 40, and a facsimile machine 50 are interconnected via a network 60. The network 60 is constituted of a LAN such as Ethernet. The types and quantities of computers and peripheral equipment connected to the network 60 are not limited to those shown in FIG. 1. For example, in place of or in addition to a PC, a workstation can be connected to the network 60. Also, a scanner can be connected to the network 60 as a piece of peripheral equipment.

Any one of PCs or printers used in this system will be denoted in the following by their reference numbers 10 and 30 respectively.

The PC 10 prepares a print job and transmits it to an arbitrary printer 30. Application software and printer driver software are installed on the PC 10. The application software is, for example, a piece of word processing software. The printer driver software is a program to control the printer 30.

The user prepares or edits image data by means of the application software. The image data here include document image data. The user instructs printing based on image data prepared or edited. It specifies the printing conditions such as the paper size, the number of prints, and the choice of single face or double face, as well as the printer 30 to be used. The printer driver prepares the print job based on the specified printing conditions. The print job contains the image data, which holds the contents to be printed and the printing conditions. The image data are normally described by the page description language (PDL). The prepared job is transmitted to the printer 30 from the PC 10 through the network 60.

The device for preparing the print job and transmitting it does not have to be limited to the PC 10, but rather can be the abovementioned workstation.

The server 20 is a computer that provides various services (communication process, database control, controlling large capacity files, printer sharing, e-mailing function, etc.) to other computers on the network 60.

Figure 2:
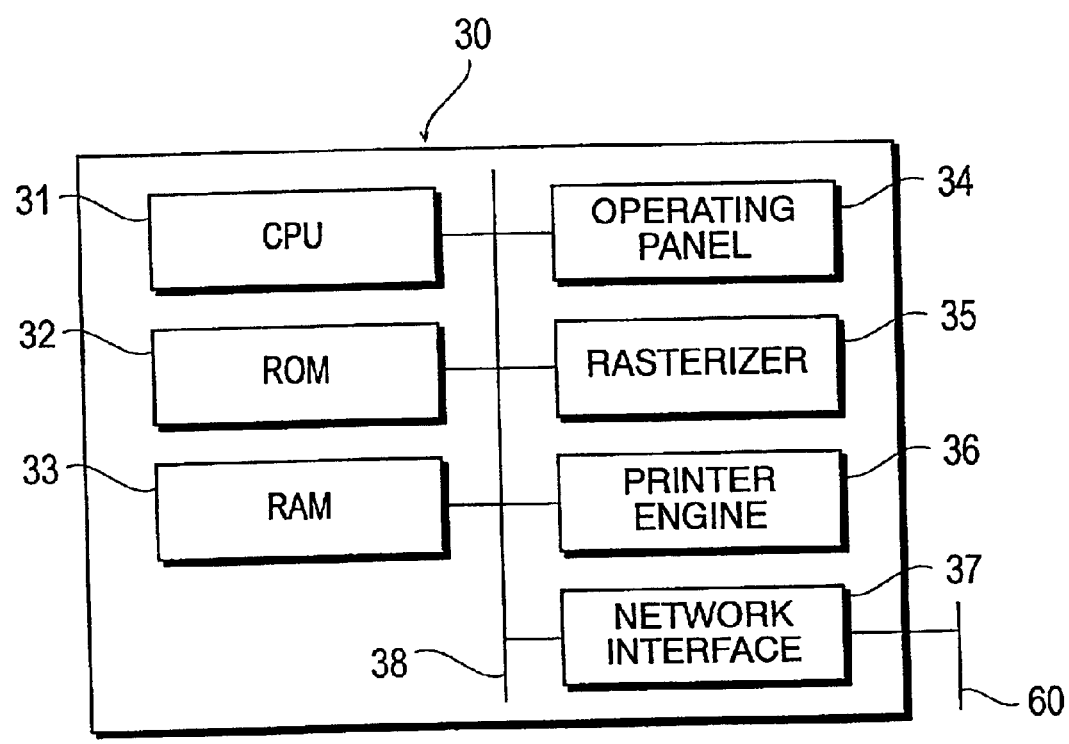
FIG. 2 is a block diagram of a printer shown in FIG. 1.

FIG. 2 is a block diagram showing an example constitution of the printer 30.

The printer 30 has, as shown in FIG. 2, a CPU 31, a ROM 32, a RAM 33, an operating panel 34, a rasterizer 35, a printer engine 36, a network interface 37, and a bus 38.

The ROM 32 stores programs. The ROM 32 also stores various font data. The ROM 32 consists of a flash ROM (sometimes called flash memory) whose contents can be electrically rewritten so that their programs and data can be updated. The RAM 33 stores data temporarily. A print job which is transmitted by the PC 10 on the network 60 is stored temporarily on the RAM 33 or a hard disk (not shown).

The operating panel 34 is used for various inputs and displays. The operating panel 34 is, for example, equipped with message displays, display lamps, and various keys. The rasterizer 35 develops the image data described in the page description language into bit map data. The rasterizer 35 is constituted of, for example, a raster image processor (RIP).

The printer engine 36 output the image data onto printing paper according to the printing conditions. The printer engine 36 consists of a laser printer (LBP) engine, ink jet printer engine, etc.

The network interface 37 connects the printer 30 to the network 60 to serve as an interface for receiving and transferring print jobs. The network interface 37 is constituted of, for example, a network interface card (NIC). The network interface card is sometimes called a LAN board. The bus 38 is used for exchanging signals between various units mentioned above.

The printer 30 divides a received print job as needed and, as a result of the division, transfers a port of the print job to a printer. This job assignment information used for determining the contents of the dividing process and transferring process is stored in the RAM 33 and the hard disk in table formats.

The job assigning information is transmitted to another printer as requested when another printer conducts dividing and transferring processes. On the other hand, if the printer 30 is to conduct dividing and transferring processes, it obtains from another printer the job assigning information of the printer.

The job assigning information includes the information concerning the function of the printer 30, the information concerning the status of the printer 30, and other information.

(1) The information concerning the function includes the information concerning the printing function such as the information concerning the printable paper size, and/or whether the printer is a color printer or monochromatic only printer. The information concerning the function is setup or entered through the operating panel 34 in advance.

(2) The information concerning the status includes the remaining amount of consumable items such as paper and toner, whether any errors such as paper jam exist, number of sheets of paper remaining in the paper discharge tray or bin, whether any printing is in process, and/or the number of print jobs waiting to be executed (number of accumulated jobs). The remaining amount of consumable items such as paper and toner, whether any errors such as paper jam exist, number of sheets of paper remaining, etc., are detected by specified sensors (not shown). Status information that varies with time is updated each time it changes.

(3) Other information includes the location where the printer 30 is installed, the font it owns, and its memory information.

Each portion of a print job obtained as a result of automatically dividing the received print job based on the job assigning information is transferred to other devices on the network 60, i.e., the printers 30, the digital copying machine 40 and the facsimile machine 50 to be printed ("division printing"). In this embodiment, prior to the division printing is executed, a transfer destination guide map showing the location information of the transfer destination will be printed by the first device designated by the user.

For the sake of simplicity, let it is described in the following a case that the user specifies the printer 30a to be used for printing.

Figure 3:
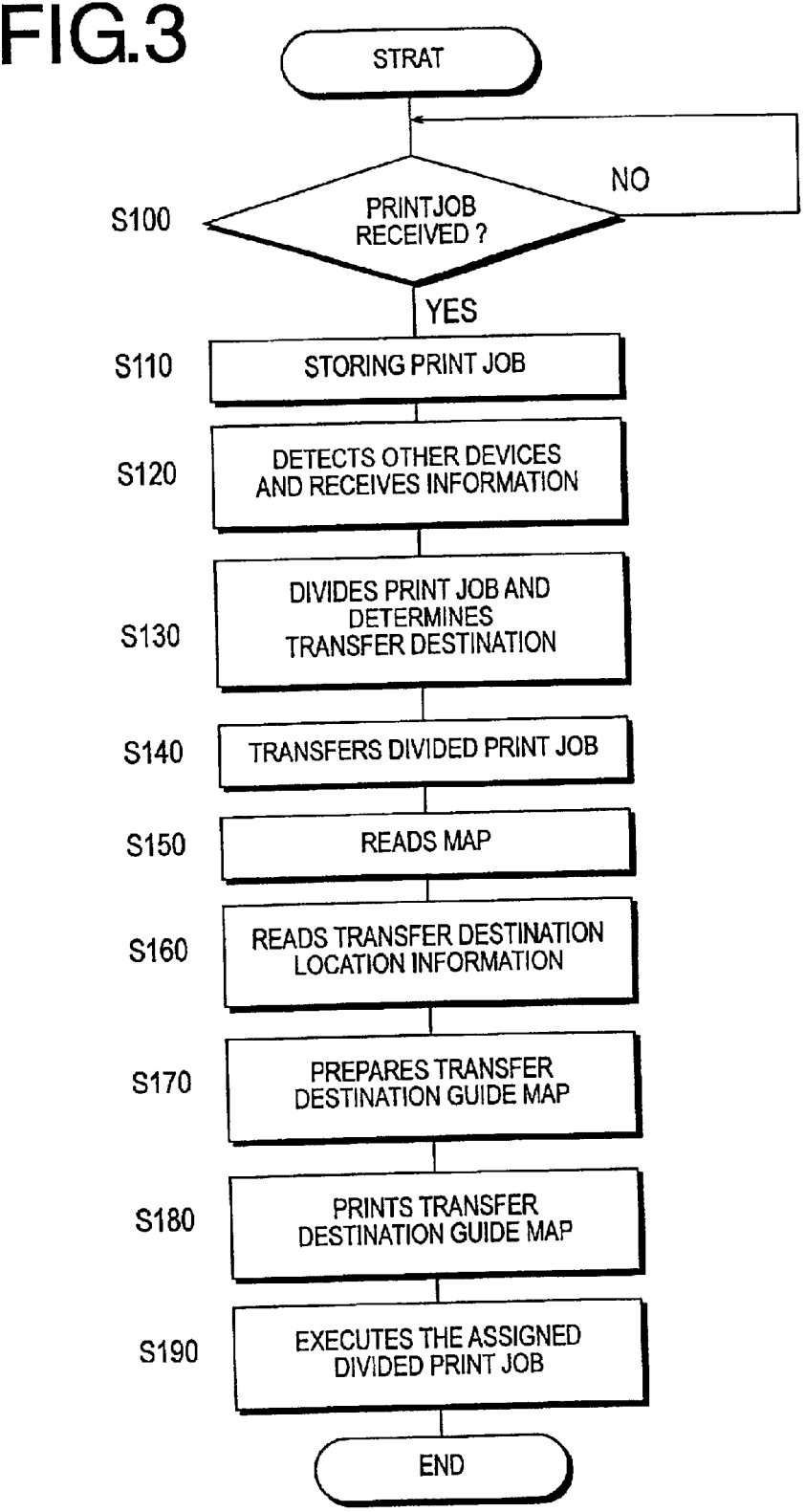
FIG. 3 is a flowchart showing the operation of a printer that corresponds to the first embodiment.

FIG. 3 is a flowchart that shows the operation of the printer 30a that corresponds to the first embodiment. More specifically, FIG. 3 shows the operation of the printer 30 when it receives a print job from the PC 10. The algorithm shown in the flowchart of FIG. 3 is stored in the ROM 32 of the printer 30 and is executed by the CPU 31.

First, at the step S100, the printer 30a makes a judgment whether a print job has been received through the network inter face 37. If the printer 30a determines that a job has been received (S100: Yes), the printer 30a executes the step S110; if the printer 30a determines a job has not been received (S100: No), if the printer 30a waits until it receives a print job.

At the step S110, the printer 30a temporarily stores in the RAM 33 the print job received at the step S100.

At the step S120, the printer 30a detects other devices connected to the network 60, and receives job assignment information from each device. For example, among various devices on the network 60, it detects printers 30b–30d other than the printer 30a that received the print job, the digital copying machine 40, and the facsimile machine 50. the printer 30a then receives job assignment information from each of these devices 30–30d, 40 and 50 via the network interface 37. The job assignment information received will be stored in the RAM 33 associated with each device.

At the step S130, the printer 30a automatically divides the received print job at the step S130. The printer 30a also determines the transfer destinations so that optimum printing can be achieved. The dividing process of the print job and determination of transfer destinations are conducted based on the contents of the print job received at the step S100, the job assignment information at various other devices, and its own job assignment information, i.e., the assignment information of the specified printer 30a, stored at the RAM 33.

(1) If color image pages and monochromatic image pages coexist in a mixed status in the image data to be printed, the print job is divided into the color image pages and the monochromatic image pages. As a result of this division, the color image pages and/or the monochromatic pages are transferred to transfer destinations respectively. The color image pages are transferred to color printers and the monochromatic pages are transferred to monochromatic printers. For example, if the printers 30a and 30b are color printers and the printers 30c and 30d are monochromatic printers, and all printers can perform printings that satisfy all printing conditions other than the color vs. monochromatic setting, the specified color printer 30a prints color image pages on its own. On the other hand, only the monochromatic image pages are printed by at least one of the monochromatic printers chosen from the monochromatic printers 30c and 30d. For example, if the other printer 30b can print faster than the specified printer 30a, the color image pages can be transferred to the other printer 30b. Moreover, if the specified printer is a monochromatic printer, the monochromatic image pages are not transferred, but rather are printed on the specified monochromatic printer. On the other hand, only the color image pages are transferred to one of the color printers selected from other printers to be printed by it.

(2) If the specified number of sheets to be printed is larger than the number of sheets remaining in the specified printer 30a, it is expected that paper empty situation will occur. In such a case, the print job is divided. The portion of the print job, which is expected to be unprintable by the specified printer 30a due to the lack of paper, are transferred to a transfer destination. At least one device that is capable of executing the printing that satisfies the specified printing condition is selected from the printers 30b–30d, the digital copying machine 40, and the facsimile machine 50 as the transfer destination.

(3) When the toner quantity judged to be required to print the image data is larger than the toner quantity remaining in the specified printer 30a, it is expected that toner empty situation will occur. In such a case, the print job is divided. The portion of the print job, which is expected to be unprintable by the specified printer 30a due to the lack of toner, is transferred to a transfer destination. At least one device that is capable of executing the printing that satisfies the specified printing condition is selected from the printers 30b–30d, the digital copying machine 40, and the facsimile machine 50 as the transfer destination.

(4) When the font specified in the received job is a font that is not stored in the memories such as the ROM 32 or the hard disk of the specified printer 30a, the print job is divided into a portion that contains the unprintable font and a portion that does not contain the unprintable font. As a result of the division, the portion that contains the unprintable font is transferred to a transfer destination. At least one device that has the font that the specified printer 30a cannot print and also is capable of executing the printing that satisfies the specified printing condition is selected from the printers 30b–30d, the digital copying machine 40, and the facsimile machine 50 as the transfer destination.

If the received print job does not contain any page that can be printed by the printer 30a, which received the job, all pages can be transferred to other printers. More specifically, the printer 30a can transfer the entire print job without dividing it to a device. The printer 30a can also divide the received job, and transfer the portions obtained as a result of the division ("divided print jobs") to various devices.

At the step S140, the printer 30a transfers the divided print jobs obtained as a result of the division to the transfer destinations determined at the step S130 via the network interface 37. Each one of the divided jobs that are transferred is executed at each device, which is the transfer destination. It is described that the divided print jobs are transferred to three printers 30b, 30c and 30d respectively.

Figure 4:
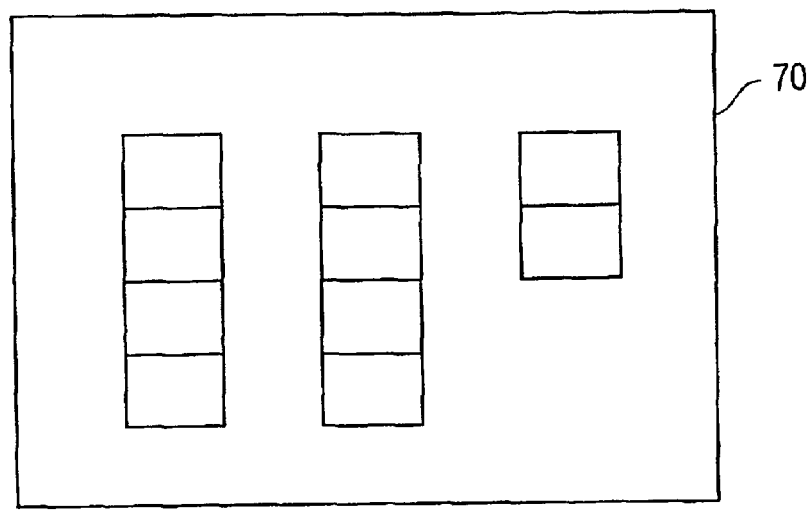
FIG. 4 is a diagram of an example map that serves as the basis of the transfer destination guide map in the first embodiment.

At the step S150, it reads the map information on which the locations of the transfer destination devices, i.e., the printers 30b, 30c and 30d, are indicated. FIG. 4 shows an example of such a map. The map 70 shown in FIG. 4 shows the layout of a room, which is the environment where the devices, or the transfer destinations, are located. The map information is stored in the inside of each device in advance. For example, the map information is stored in the ROM 32 of the printer 30a. The map information can be updated and it is updated to the latest one each time when the layout in the room changes.

Different from this embodiment, the map information can also be stored as shared information in equipment such as the server 20 on the network 60. In such a case, the printer 30 obtains the map information through the network 60 as required.

At the step S160, the printer 30a reads the location information of the transfer destination devices, i.e., the printers 30b, 30c and 30d. The location information of each device is included in the job assignment information of each of the printers 30b, 30c and 30d received at the step S120.

Although the location information of each device is stored in each device as the job assignment information in this embodiment, it is also possible, different from this embodiment, to have the location information of each device stored as common information in equipment such as the server 20 on the network 60 in advance. In such a case, the printer 30 obtains the map information through the network 60 as required. The location information of each device can be updated and it is updated to the latest one by automatic detection each time when the layout in the room changes.

Figure 5:
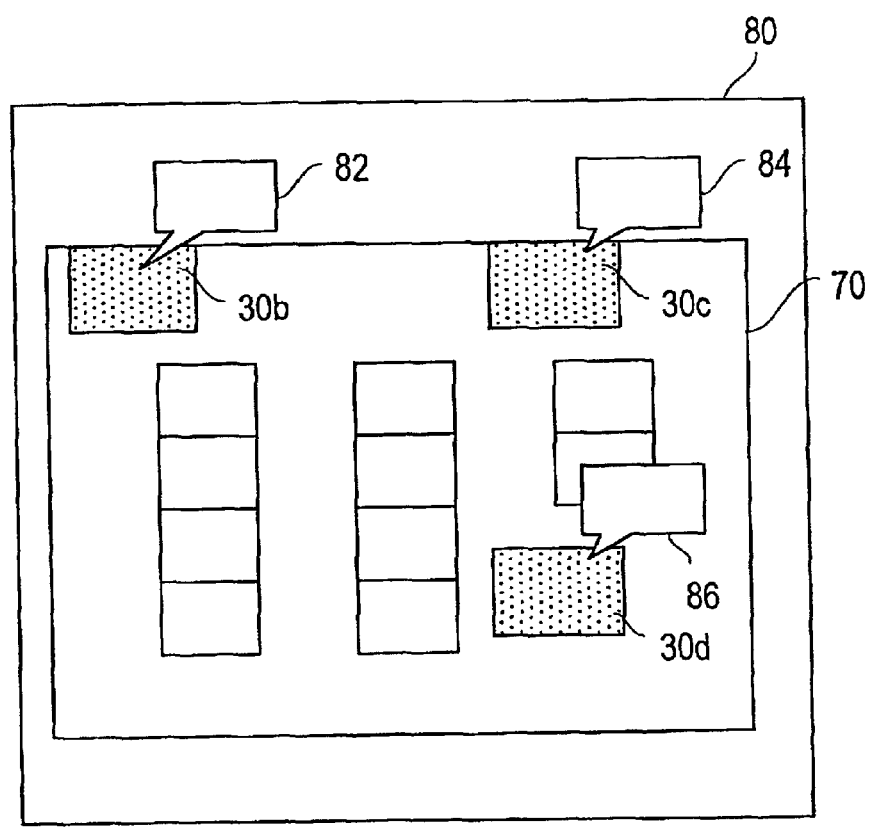
FIG. 5 is a diagram showing an example of a transfer destination guide map in the first embodiment.

At the step S170, the locations of the devices (printers 30b, 30c and 30d) read at the step S160 are added to the map read at the step S150. Thus, the transfer destination guide map is completed. FIG. 5 is a diagram showing an example of the transfer destination guide map. The transfer destination guide map 80 may be added with other useful information for the user in addition to the transfer destinations. The additional information may include, for example, the estimated print out completion time, the number of sheets to be printed, and/or the order of print pick up (course). For example, in case of FIG. 5, balloons 82, 84 and 86 are provided in the areas where the transfer destination devices (printers 30b, 30c and 30d) are shown. The balloon 82 contains useful information for the printer 30b, the balloon 84 contains useful information for the printer 30c, and the balloon 86 contains useful information for the printer 30d.

Figure 6:
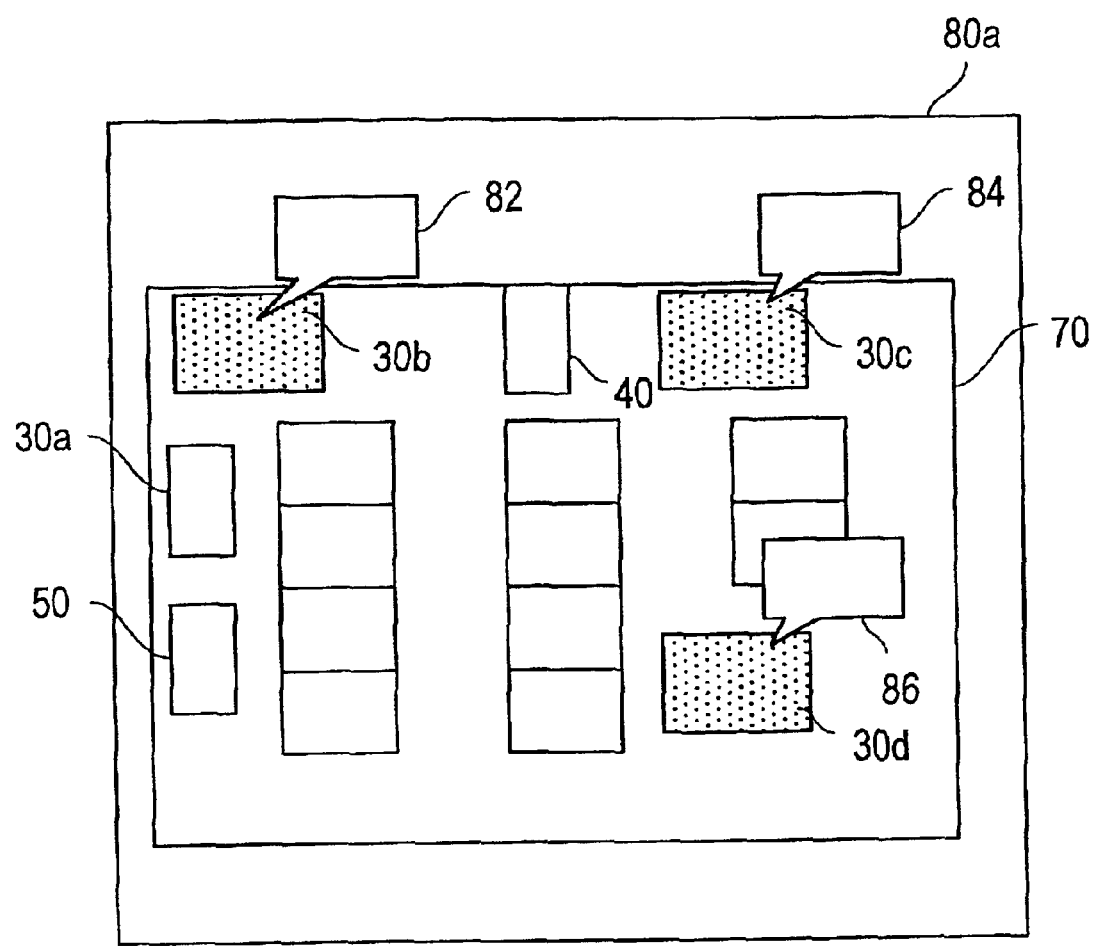
FIG. 6 is a diagram of another example of a transfer destination guide map in the first embodiment.

FIG. 6 is a diagram of another example of a transfer destination guide map. The transfer destination guide map 80a shown in FIG. 6 indicates the locations of all devices connected to the network 60, i.e., the printers 30a–30d, the digital copying machine 40, and the facsimile machine 50, wherein the transfer destination devices, i.e., the destination devices 30a, 30b, 30c and 30d, are being displayed with an arbitrary special effect so that they can be easily identifiable, for example, displayed in a different color or screened. In order to prepare the transfer destination guide map shown in FIG. 6, it is necessary to be configured in such a way as to read the position data of all the devices on the network 60 at the step 160, or to write in advance the position data of all the devices in the map which is read at the step S150.

In case of FIG. 5, the specified printer 30a itself is not shown. Also, in case of FIG. 6, there is no indication for identifying the specified printer 30a although the description of the specified printer 30a itself exists. However, different from this embodiment, it can be configured in such a way that the user can specify the location of the specified device. In such a case, the position of the specified printer 30a is described in the example of FIG. 5. In case of FIG. 6, the display for identifying the specified printer 30a is being made.

At the step S180, it prints the transfer destination guide maps 80 or 80a prepared at the step S170 and shown in FIG. 5 and FIG. 6. More specifically, the rasterizer 35 develops the prepared data of the transfer destination guide maps 80 and 80a into bit map data and the printer engine 36 prints them out on paper.

At the step S190, the specified printer 30a that received the print job executes the already divided print job that it is specified for. More specifically, the rasterizer 35 develops the image data included in the already divided print job, to which it is specified, into bit map data. After that, the printer engine 36 prints it out on paper based on the printing condition.

Figure 7:
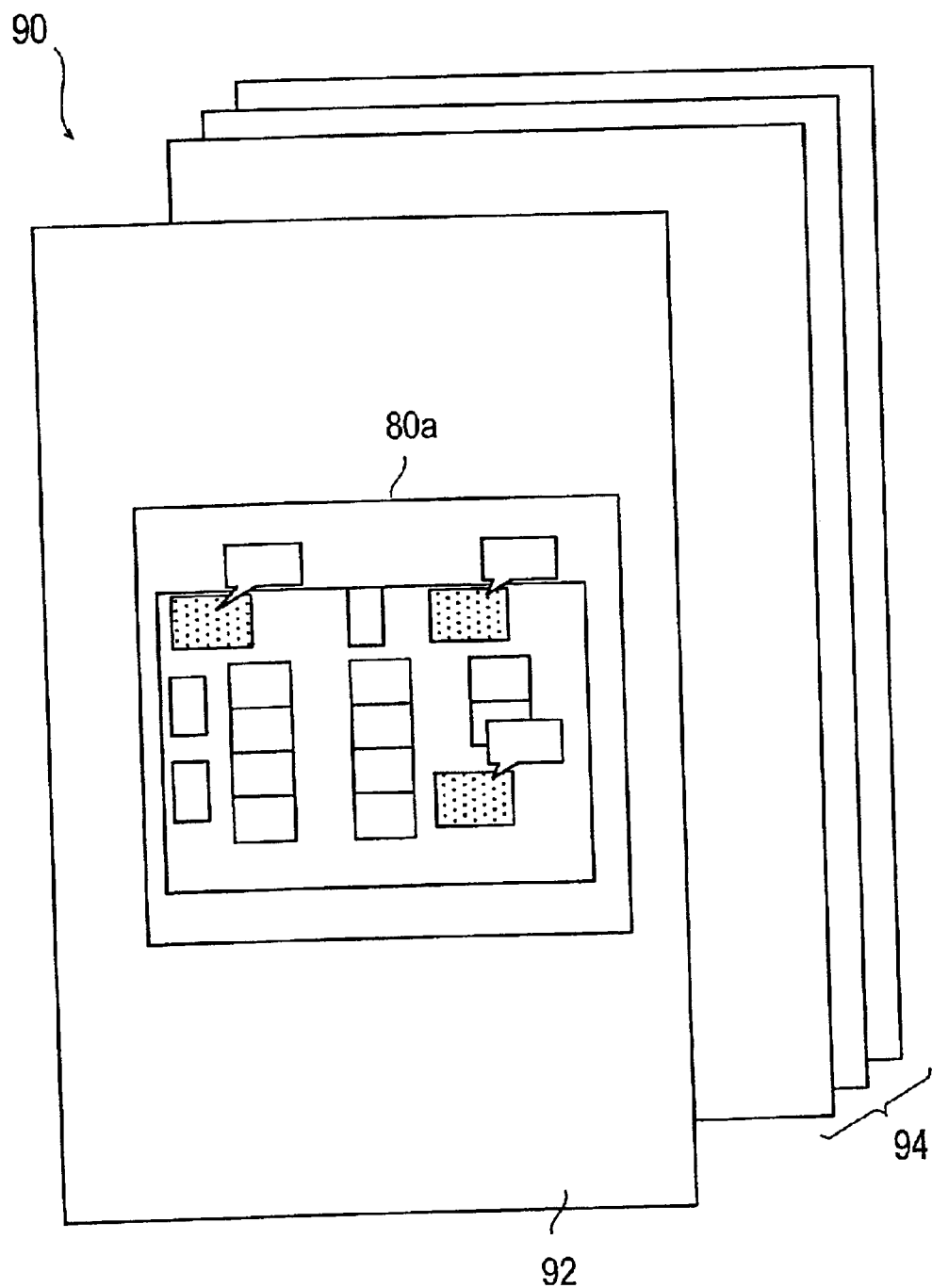
FIG. 7 is a diagram showing an example printed matter printed by the specified printer 30a in the first embodiment.

FIG. 7 is a diagram showing the printed sheets to be discharged from the specified printer 30a, to which the job is transferred, as a result of the processes at the step S180 and the step S190. As shown in FIG. 7, a bundle 90 of the entire printed pages to be discharged from the specified printer 30a consists of a sheet 92 with the transfer destination map 80a printed at the step S180 and a bundle 94 of the pages printed at the step S190.

The user goes to the printer 30a that the user has specified to pick up the printed pages. If the print job was automatically divided and printed, the user can go to other devices to pick up the rest of the printed pages looking at the transfer destination guide map on the sheet 92. The user can efficiently pick up all the rest of the printed pages even if the job has been assigned to multiple printers so long as the user can rely on the transfer destination guide map.

Therefore, according to this embodiment, even if a print job is automatically divided and transferred to multiple devices on the network for printing, the user can easily know where to collect the rest of the pages without memorizing or writing down the transfer destinations as the system prints a map showing the locations of those transfer destination devices.

While the printed map is a map for guiding the user about where to pick up the printed pages, but its usefulness of such a printed map can be enhanced by adding other useful information, e.g., the time of print out, number of printed sheets, optimum pick up course, etc.

Second Embodiment The second embodiment is a case where printing is executed without interruption by dividing the print job and printing it by other printers when a minor error occurs at the specified device such as a shortage of paper of the particular size or paper jam.

It is described that the user is specifying the printer 30a for the sake of simplicity.

Figure 8:
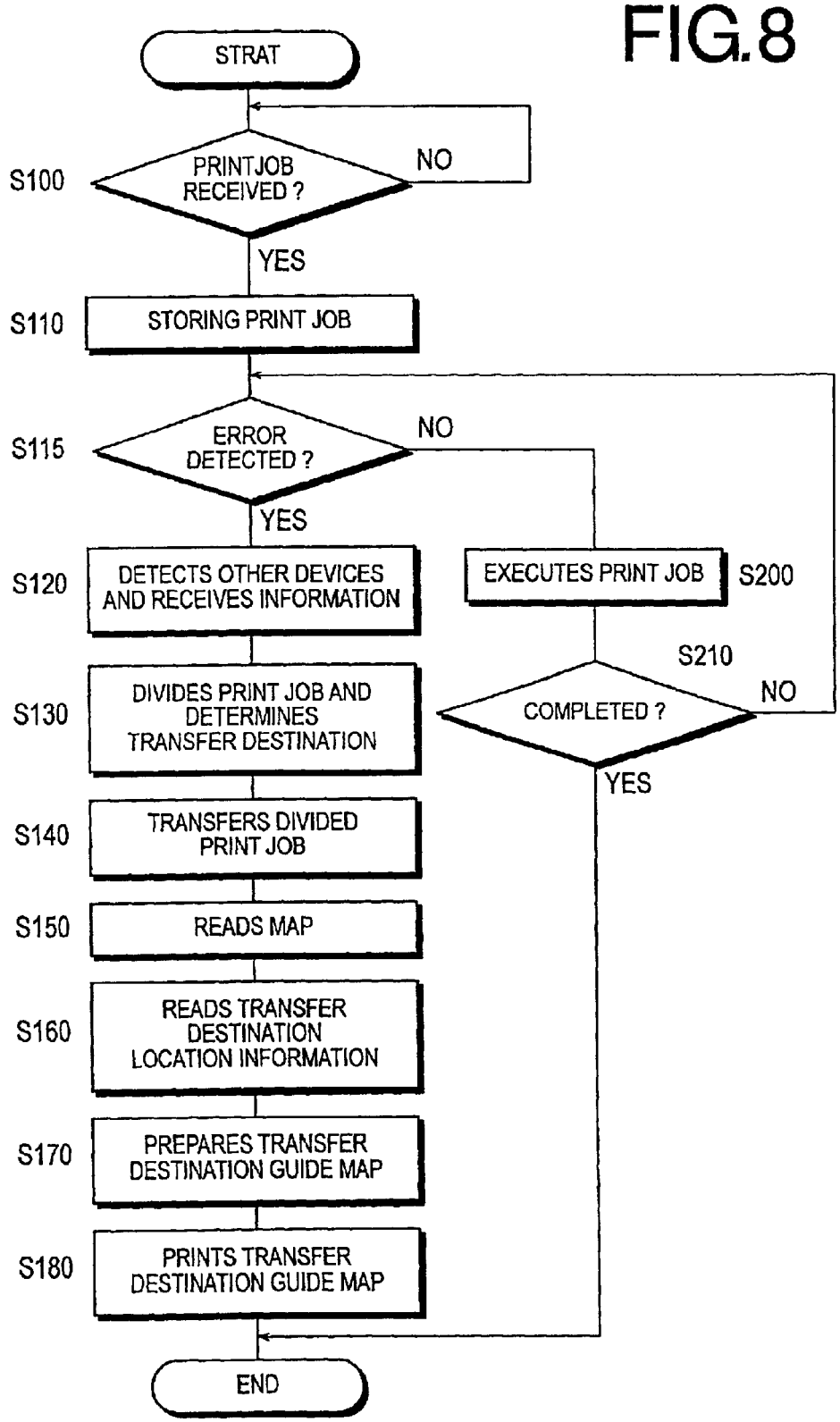
FIG. 8 is a flowchart showing the operation of a printer corresponding to a second embodiment.

FIG. 8 is a flowchart showing the operation of the printer 30a that corresponds to the second embodiment. Specifically, FIG. 8 shows the operation of the printer 30a when it receives a print job from the PC 10. The algorithm shown in the flowchart of FIG. 8 is stored as a control program in the ROM 32 of the printer 30 and is executed by the CPU 31. The drawing used here is the same as the one used in the first embodiment unless otherwise indicated specifically.

Since the steps S100 and S110 are identical to those in the flowchart shown in FIG. 3, their descriptions are not repeated here.

At the step S115, a judgment is made whether above-mentioned minor error is detected. The minor errors mentioned here mean errors that allow the printer 30a to print at least the transfer destination guide maps 80 and 80a. The minor errors include cases such that the specified printer 30a does not have the specified font or the specified paper size. Such errors can be detected by comparing the information contained in the received print job and the job assignment information for the specified printer 30a stored in the RAM 33. If no minor errors are detected (S115: No), the step S200 is executed; if a specified minor error is detected (S115: Yes), the step S120 is executed.

At the step S200, a print job received at the step S100 is executed. More specifically, the rasterizer 35 develops the image data contained in the print job into bitmap data. After that, the printer engine 36 prints it on paper according to the printing condition.

At the step S210, the printer 30a makes a judgment whether the execution of the print job is completed. If the execution of the print job is not completed (S210: No), it returns to the step S115, while the printer 30a terminates the series of process if the execution of the print job is completed (S210: Yes).

Since the steps S120 through S180 are identical to those steps in the flowchart shown in FIG. 3, the detail descriptions will not be repeated here except specific examples.

When it is detected that the specified font is not available (S115: Yes) in the specified printer 30a during the execution of the print job (S200), other devices on the network 60 are detected and the job assignment information are received by them (S120). After that, the print job is divided into the executed portion and the yet-to-be executed portion. One or more devices are determined as the transfer destination devices to which the ye-to-be-printed portion is transferred (S130). As a result of the division, the divided print job that corresponds to the ye-to-be-printed portion is transferred (S140). Thus, the map shown in FIG. 4 and the locations of the transferred destinations are both read (S150, S160), the transfer guide map are prepared (S170), and printed (S180).

The user goes to the printer 30a that the user has specified to pick up the printed pages. If the print job was automatically divided and printed, the user can go to other devices to pick up the rest of the printed pages looking at the transfer destination guide map. As a result, the user can efficiently pick up all the rest of the printed pages even if the print job transfer occurs unexpectedly so long as the user can rely on the transfer destination guide map.

Third embodiment

The third embodiment shows a case where the transfer destination location information is insert printed instead of the transferred page. In this embodiment, the transfer destination guide map added with the transfer destination's location information is insertion-printed. The contents of the insertion printing will be described later. Since the constitution of the network system in this embodiment including the PC 10a–10g, printer 30a–30d, digital copying machine 40 and facsimile machine 50 is identical to that shown in FIG. 1 and FIG. 2 in the first embodiment, the detail descriptions are not repeated here. Identical members are identified using the same reference codes.

For the sake of the simplicity, it is described that the PC 10 specifies the printer 30a, and the printer 30a transfers a portion of the print job it received to the printers 30b and 30c.

Figure 9:
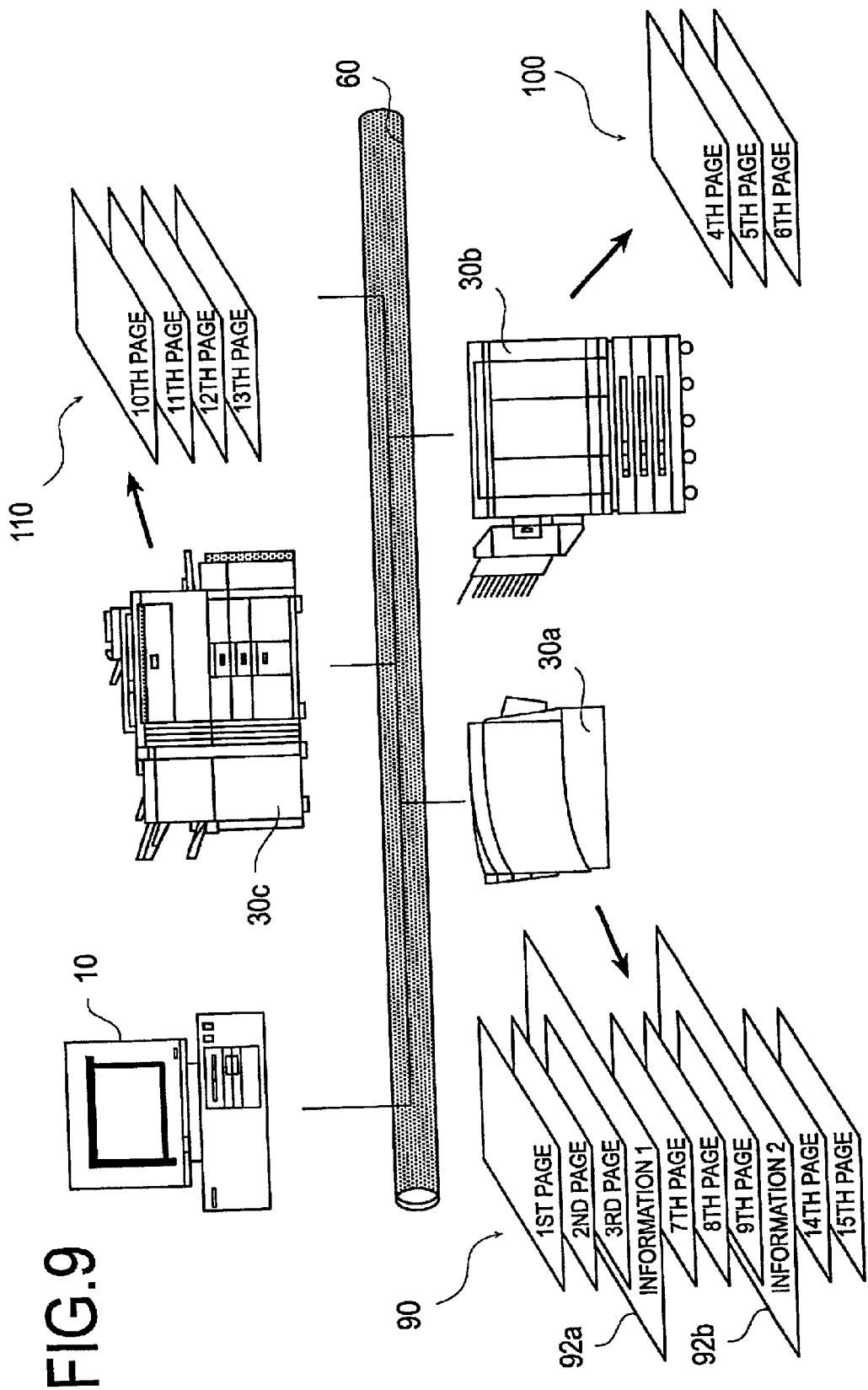
FIG. 9 is a diagram showing a specific example corresponding to a third embodiment where a printer divides and transfers a print job by page.

FIG. 9 is a diagram for describing the contents of the process in a case corresponding to the third embodiment, where a printer divides the received print job by page and transfers them to other printers. Hereinafter, "transferring pages to another printer" means "transferring a divided print job that correspond to a certain number of pages to another printer." Another printer, which is the transfer destination, will print the transferred pages.

The PC 10 transmits a print job containing image data corresponding to multiple pages of images to the specified printer 30a. In the case shown in FIG. 9, the printer 30a receives a print job containing image data corresponding to 15 pages. The printer 30a divides the print job according to a specified condition similar to those indicated in the first and second embodiments. The image data contained in the print job are normally prepared by page so that they can be applied a page printer. Therefore, it is possible to select image data that correspond to certain pages from the image data contained in the print job. A divided print job is prepared by adding the corresponding printing condition to the image data corresponding to the selected pages. The divided print jobs are then transferred to the other printers 30b and 30c to be executed. On the other hand, the remaining divided print job, which was not transferred, is executed by the printer 30a.

In the case shown in FIG. 9, the 4th through the 6th pages among the originally received print job consisting of 15 pages will be transferred to the other printer 30b. The 10th through 13th pages will be transferred to the other printer 30c. The transferred pages will be printed by the printer 30b and 30c and the resultant printed matters 100 and 110 will be discharged. The remaining pages that are left without being transferred will be printed by the printer 30a and discharged as the printed mater 90.

The printer 30a insertion-prints the transfer destination's location information on the page where the pages that were transferred to the other printers 30b and 30c existed. The insertion printing means printing immediately after printing the remaining pages that are left without being transferred. In other words, the insertion printing means printing the transfer destination's location information instead of printing the transferred page on the page where the transferred page existed.

In case of FIG. 9, the pages 92a and 92b showing the transfer destination guide maps containing the transfer destinations' location information are printed between the 3rd page and the 7th page as well as the 9th page and the 13th page.

Thus, according to insertion printing the transfer destinations' location information on the pages where the transferred pages existed, the user can instantaneously see the locations of the pages where the transferred pages existed.

It is preferable to conduct the insertion printing on a sheet of paper larger than the paper used for printing regular pages, as the user can see at a glance the fact that there was a page that was transferred and the location it existed.

Figure 10:
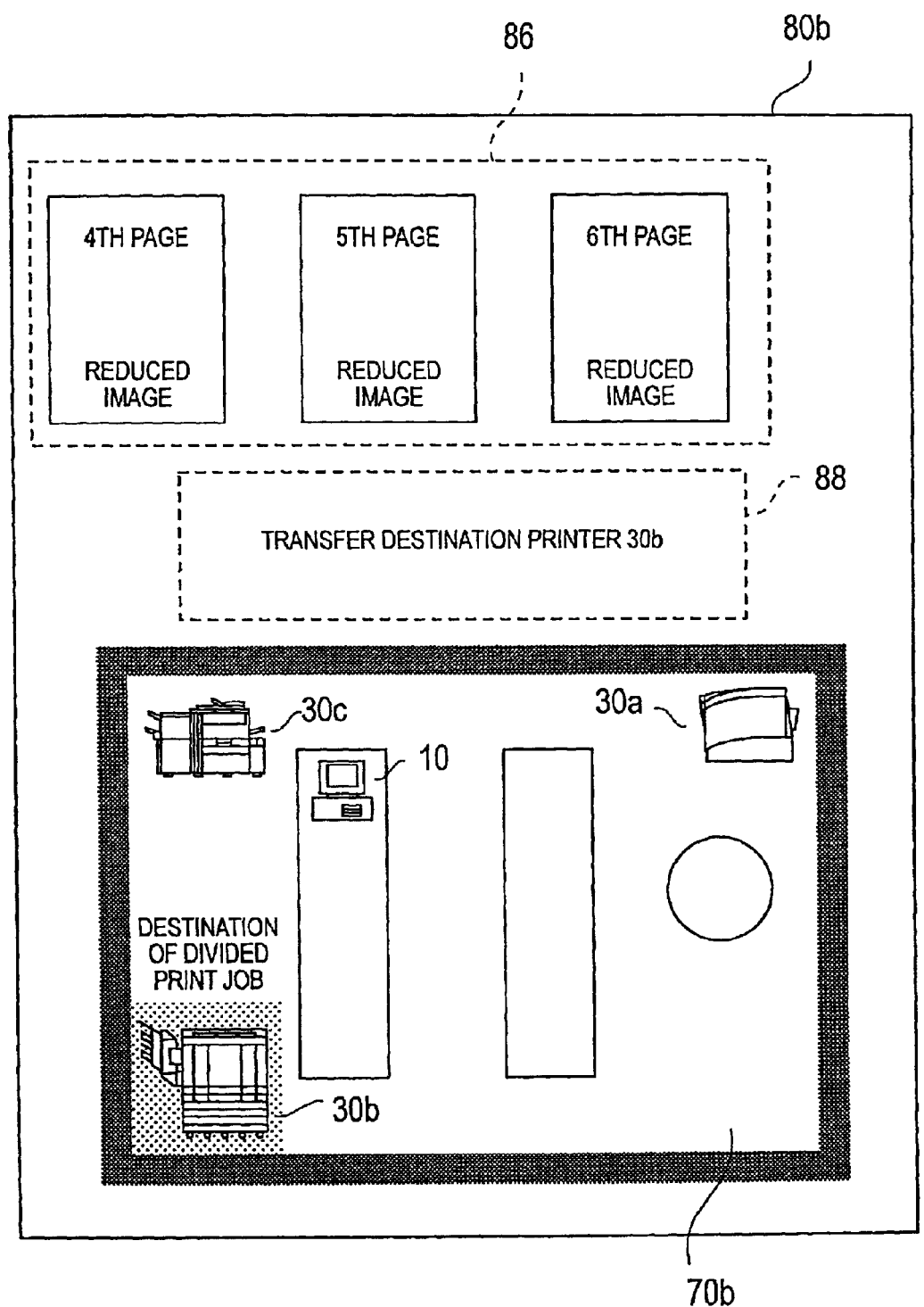
FIG. 10 is a diagram showing an example of an insertion-printed page in the third embodiment.
Figure 11:
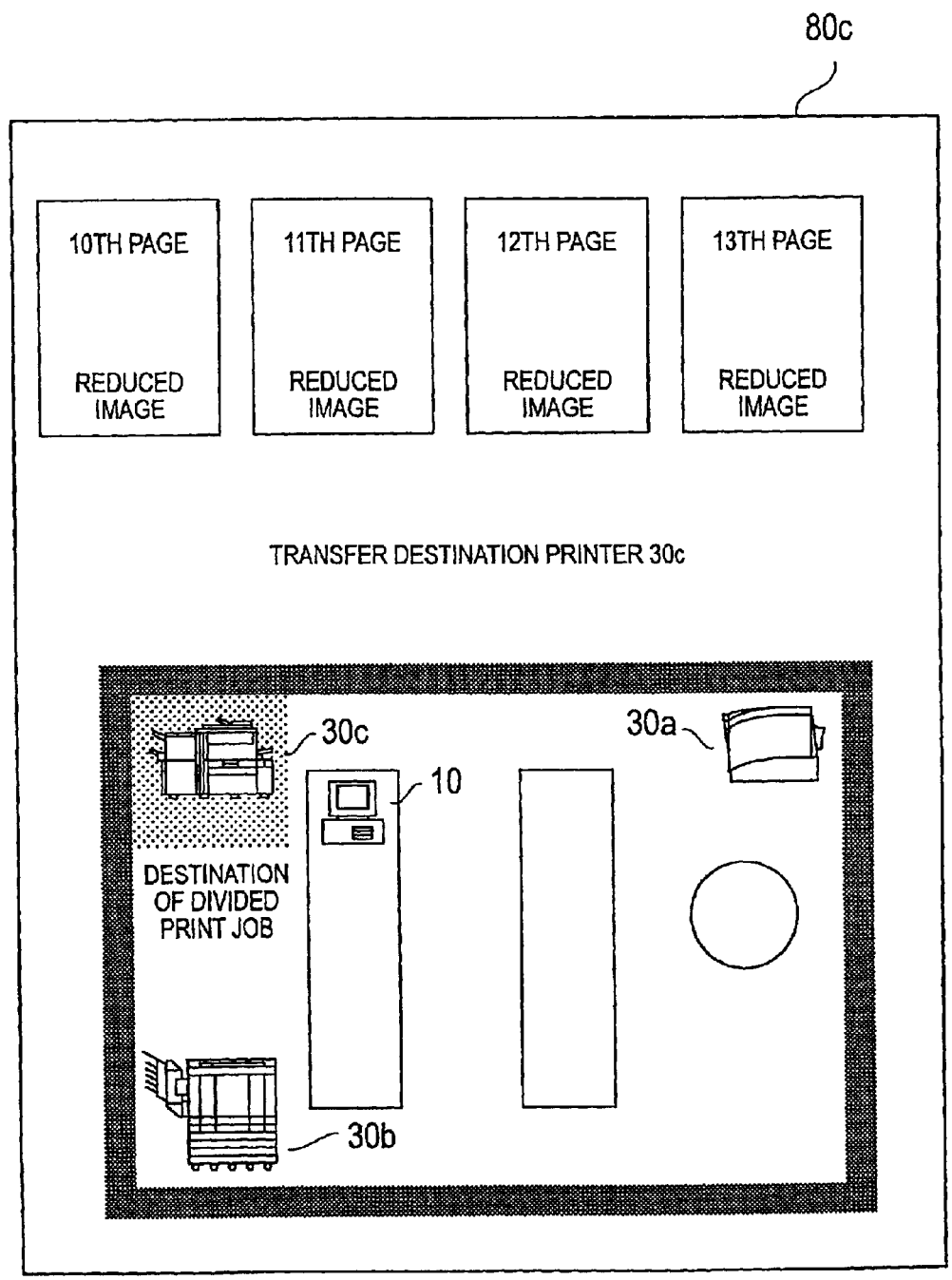
FIG. 11 is a diagram showing an example of another insertion-printed page in the third embodiment.

FIG. 10 and FIG. 11 are diagrams to show specific examples of insertion printed pages.

FIG. 10 shows a page insertion-printed on the page location where the pages that were transferred to the other printer 30*b* existed, i.e., between the 4th and the 6th pages.

As can be seen from FIG. 10, reduced images 86 of the pages that were transferred are preferably printed in addition to a transfer destination guide map 70*b*. As a result, the user can see the contents of the transferred pages. Moreover, reduced images 86 are attached with the page numbers of the transferred pages. Moreover, the name of the transfer destination device 88 is added as well.

For example, the transfer destination guide map 70*b* shows multiple printers 30*a*, 30*b* and 30*c* diagrammatically. The printer 30*b* selected as a transfer destination printer is shown in a different shape and color to indicate it as the transfer destination printer. It is also possible to indicate the printer 30*b* as the job transfer destination by adding an arrow or adding a caption. This is the same as the transfer destination guide map described in the first embodiment.

Figure 12:
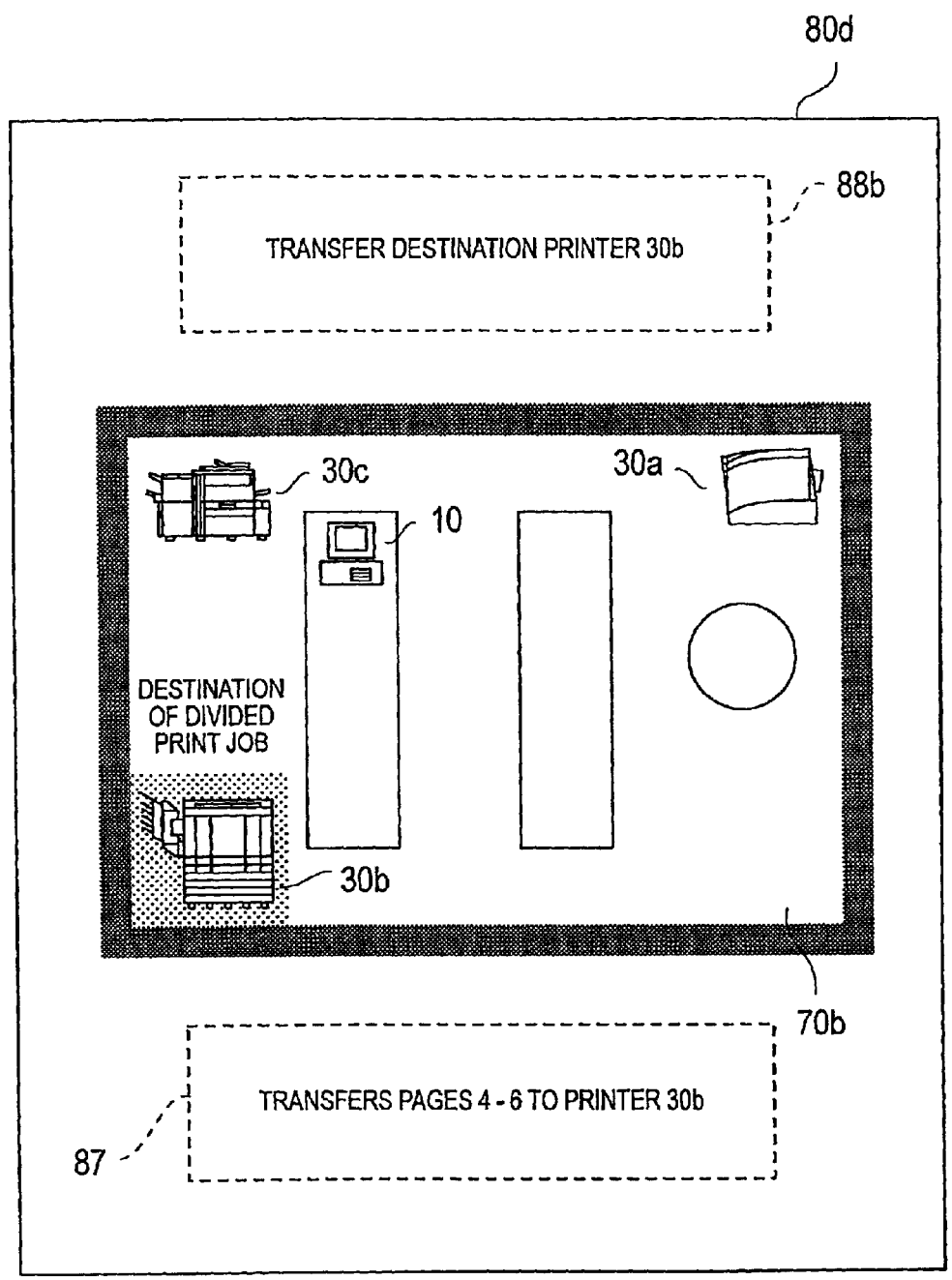
FIG. 12 is a diagram showing another example of an insertion-printed page in the third embodiment.
Figure 13:
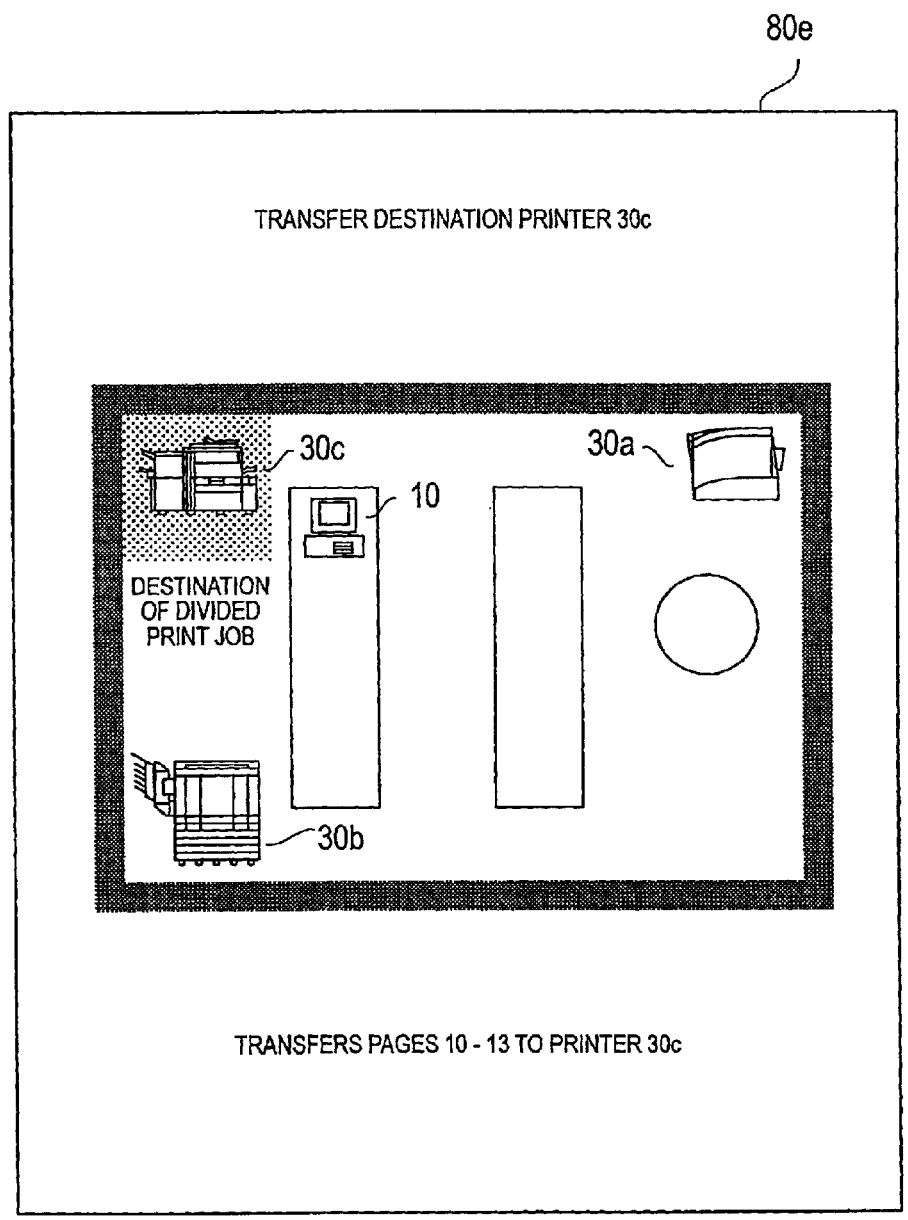
FIG. 13 is a diagram showing another example of another insertion-printed page in the third embodiment.

FIG. 11 shows a case where various kinds of information are printed on a page where the pages transferred to the other printer 30*c* existed, i.e., between the 10th and 13th pages. The contents shown in FIG. 11 are similar to those shown in FIG. 10, so that detailed information is not repeated here. The format of printing transfer destination guide map is not limited to the one shown in FIG. 10 and FIG. 11. For example, as shown in FIG. 12 and FIG. 13, it is possible to print the transfer destination device's name 88*b*, the transfer destination guide map 70*b*, where the transfer destination printer 30*b* is shown, and the page numbers 87 of the transferred pages, skipping the printing of the reduced images of the transferred pages.

Figure 14:
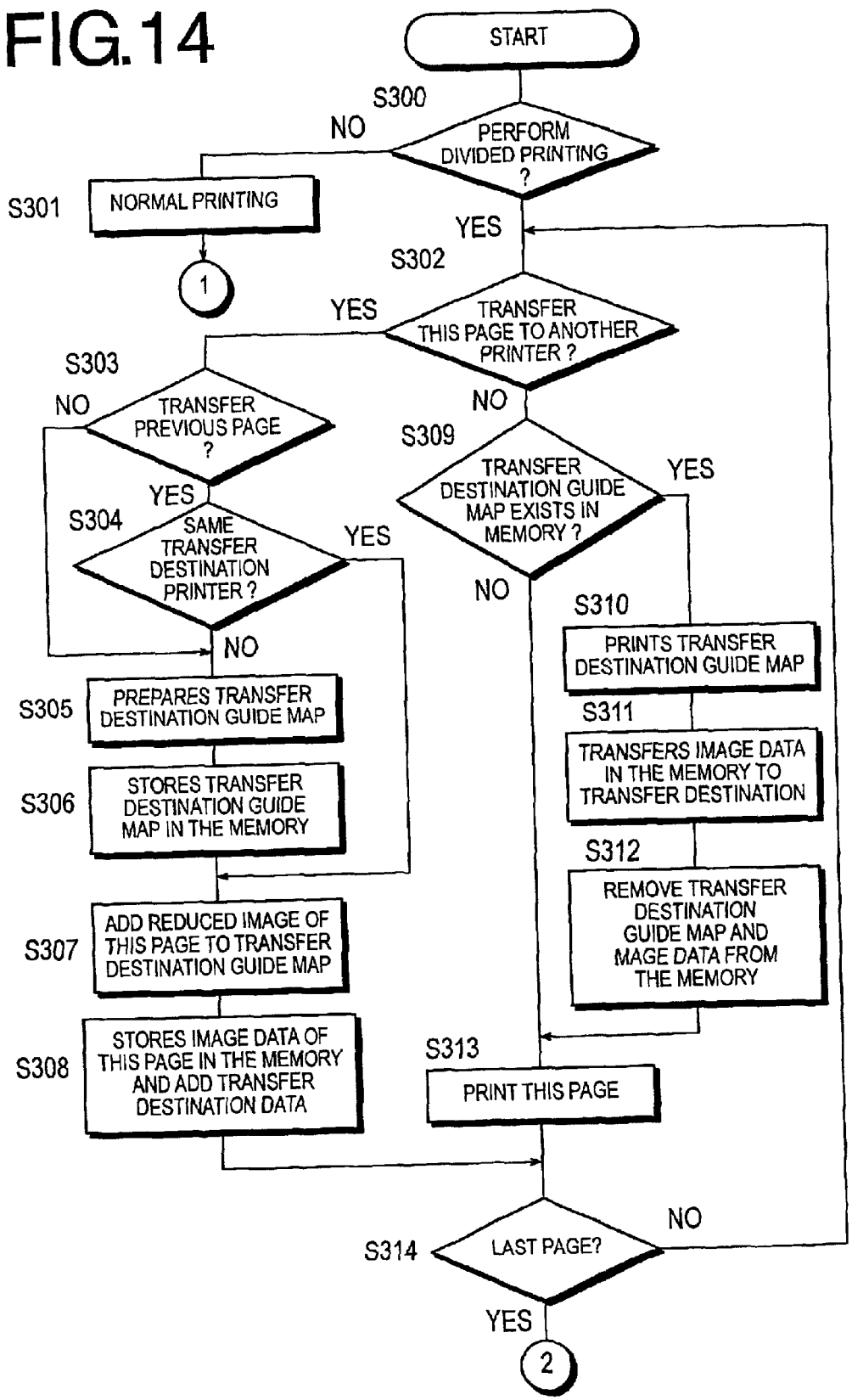
FIG. 14 is a flowchart showing the operation of a printer corresponding to the third embodiment.
Figure 15:
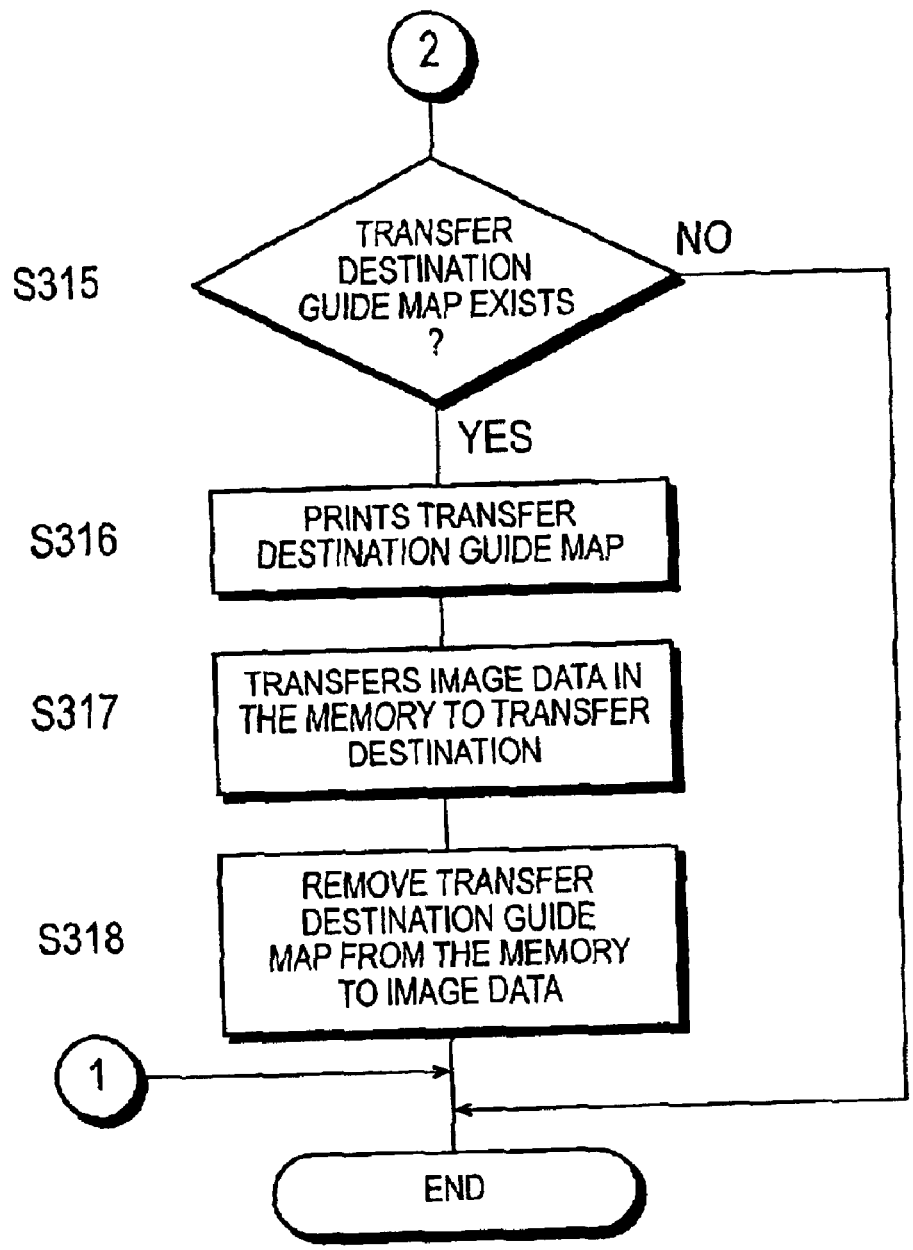
FIG. 15 is a flowchart that continues from FIG. 14.

FIGS. 14 and 15 show a flowchart representing the operation of the printer 30*a* that corresponds to the third embodiment. The algorithm of the flowchart shown in FIGS. 14 and 15 is stored as the control program in the ROM 32 of the printer 30*a* and is executed by the CPU 31.

At the step S300, a judgment is made whether the print job is to be divided for printing. If the divided printing is not to be executed (S100: No), the process of the step S301 is executed. If the divided printing is to be executed (S300: Yes), the step S301 will be skipped.

At the step S301, regular printing is performed.

At the step S302, a judgment is made whether the job should be transferred by page. The judgment whether the page is to be transferred is to be performed according to various conditions as in the case of the first embodiment.

For example, the pages of the received print job that cannot be printed by the printer 30*a* are transferred. Alternatively, either color pages or monochromatic pages of the received print job are transferred. Or, alternatively, pages of one kind of page size are transferred from the received print job. Moreover, if the printer 30*a* is short of supply concerning a certain color toner is lacking, or a certain size of paper, some pages may have to be transferred to other printers. Similarly, if the printer 30*a* does not have a specified font, some pages may have to be transferred to other printers. The transfer destination is selected from the devices suitable for printing the transferred pages. If the page that is being judged is to be transferred (S302: Yes), the step S303 is executed, while the step S309 is executed if it is not to be transferred (S303: No).

At the step S303, a judgment is made whether the page previous to the page currently in question should be transferred. If the previous page is also a page to be transferred (S303: Yes), the process of the step S304 is executed. If the previous page is a page not to be transferred (S303: No), the process of the step S305 is executed.

At the step S304, a judgment is made whether the page in question is transferred to the same destination as the page previous to the page in question. If the transfer destination of the page currently in question is the same as the transfer destination of the previous page (S304: Yes), the process of the step S307 is executed, while the process of the step S304 is executed if they are different (S304: No).

At the step S305, the transfer destination guide map 70*b* as shown in FIG. 10 is prepared. Since the preparation of the transfer destination guide map 70*b* is similar to the process of the steps S150 through S170 shown in FIG. 3 of the first embodiment, detail description is not repeated here.

At the step S306, the transfer destination guide map 70*b* prepared at the step S305 will be stored in the RAM 33 (memory).

At the step S307, the reduced images 86 of the transferred pages are added to the insertion-printed page as shown in FIG. 10.

At the step S308, the image data of the pages to be transferred are temporarily stored in the RAM 33. The image data are also added with the transfer destination's data. The transfer destination names 88 and 88*b* are also added to the insertion printed page.

At the step S309, a judgment is made whether the transfer destination guide map 70*b* containing the location information of the transfer destination prepared at the steps S305 through S308 is temporarily stored in the RAM 33. If the transfer destination guide map 70*b* is stored in the RAM 33 (S309: Yes), the process of the step S310 is executed, while the process of the step S313 is executed if it is not stored (S309: No).

At the step S310, the contents of the transfer destination guide map are finalized and a page containing the transfer destination guide map 70*b* added with the reduced images 86 and the transfer destination device name 88 is insert-printed.

At the step S311, the image data of the transferred pages and the printing condition temporarily stored at the step S308 are transferred as the divided print jobs to the transfer destination printers 30*b* and 30*c*.

At the step S312, the transfer destination guide map 70*b* and the image data of the page temporarily stored in the RAM 33 are removed and the memory area is initialized.

At the step S313, the printer 30*a* prints the page that is judged not to be transferred at the step S302.

At the step S314, a judgment is made whether the page in question is the last page. If the page in question is not the last page (S314: No), it will return to the process of the step S302, and a judgment is made whether the page is to be transferred to the other page 30*b* or 30*c*. If the page in question is the last page (S314: Yes), the processes of the steps S315 through S318 shown in FIG. 15 is executed.

The processes of the steps S315–S318 are similar to those of the aforementioned steps S309–S312. If the transfer destination guide map is temporarily stored in the RAM 33 at the step S315, the last page is always a page to be transferred. The reason is that the transfer destination guide map stored in the RAM 33 should have been deleted at the step S312, if the last page were a page that is not to be transferred (S302: No).

Therefore, the processes of the steps S315–S319 are executed only when a series of pages including the last page, and the transfer destination guide map 70b added with the reduced images 86 and the transfer destination device names 88 and 88b are printed by executing the processes of the steps S315–S319.

The process contents of the flowchart shown in FIG. 14 and FIG. 15 is described using a case shown in FIG. 9 as an example.

According to the process of the step S302 shown in FIG. 14, the first through third pages are judged not to be transferred to the other printers 30b and 30c (S302: No). Consequently, the first through third pages are printed by the printer 30a according to the step S313.

On the other hand, the fourth page is judged to be transferred to the other printer 30b according to the step S302 of FIG. 14 (S302: Yes). Since the third page that is also the previous page is not transferred (S303: No), the transfer destination guide map 70b is prepared anew according to the processes of the steps S305–S308. The transfer destination devices' names 88 or 88b as well as the reduced image of the fourth page (including the page number) are added to the page of the transfer destination guide map prepared as above.

It is determined that the fifth page is to be transferred to the other printer 30b (S302: Yes). Since its transfer destination is the printer 30b, the same as the transfer destination of the fourth page, i.e., the previous page (S304: Yes), a new transfer destination guide map 70b is not prepared, and the reduced image of the fifth page is added according to the process of the step 307 to the transfer destination guide map 70b, which was prepared during the fourth page process. The process for the sixth page is the same as that of the fifth page.

It is determined that the seventh page is not to be transferred to the other printer 30b (S302: Yes). At the step S309, a judgment is made whether the transfer destination guide map 70b is temporarily stored in the RAM 33. Since the transfer destination guide map 70b prepared in the above process is temporarily stored (S309: Yes), the page contents including the transfer destination guide map 70b, the transfer destination device name 88, the reduced image 80b, etc., are finalized at the step S310, and printed by the printer 30a. The transfer destination guide map is thus insert-printed immediately after the printing of the first through third pages.

At the step S311, the image data of the fourth and fifth pages stored in the memory are transferred with the printing condition as the print job to the transfer destination. When the printing of the transfer destination guide map and the transfer of the print job are finished, the memory area of the RAM 33 is initialized at the step S312.

The seventh page is printed by the printer 30a at the step S313.

As seen in the above, the received print job is divided to a print job to be transferred and a print job not to be transferred. A series of continuous multiple pages of image data that are to be transferred to the same transfer destination are processed as a single divided print job. A transfer destination map is prepared for each transferred divided print job by adding series page numbers, reduced images, and a transfer destination device name. Consequently, a new transfer destination map is produced each time the divided print job transfer destination is changed.

Although a case of judging whether the pages should be transferred page by page is described in the above description, it is also possible to judge whether a page should be transferred by number of copies and transfer the pages by number of copies.

Figure 16:
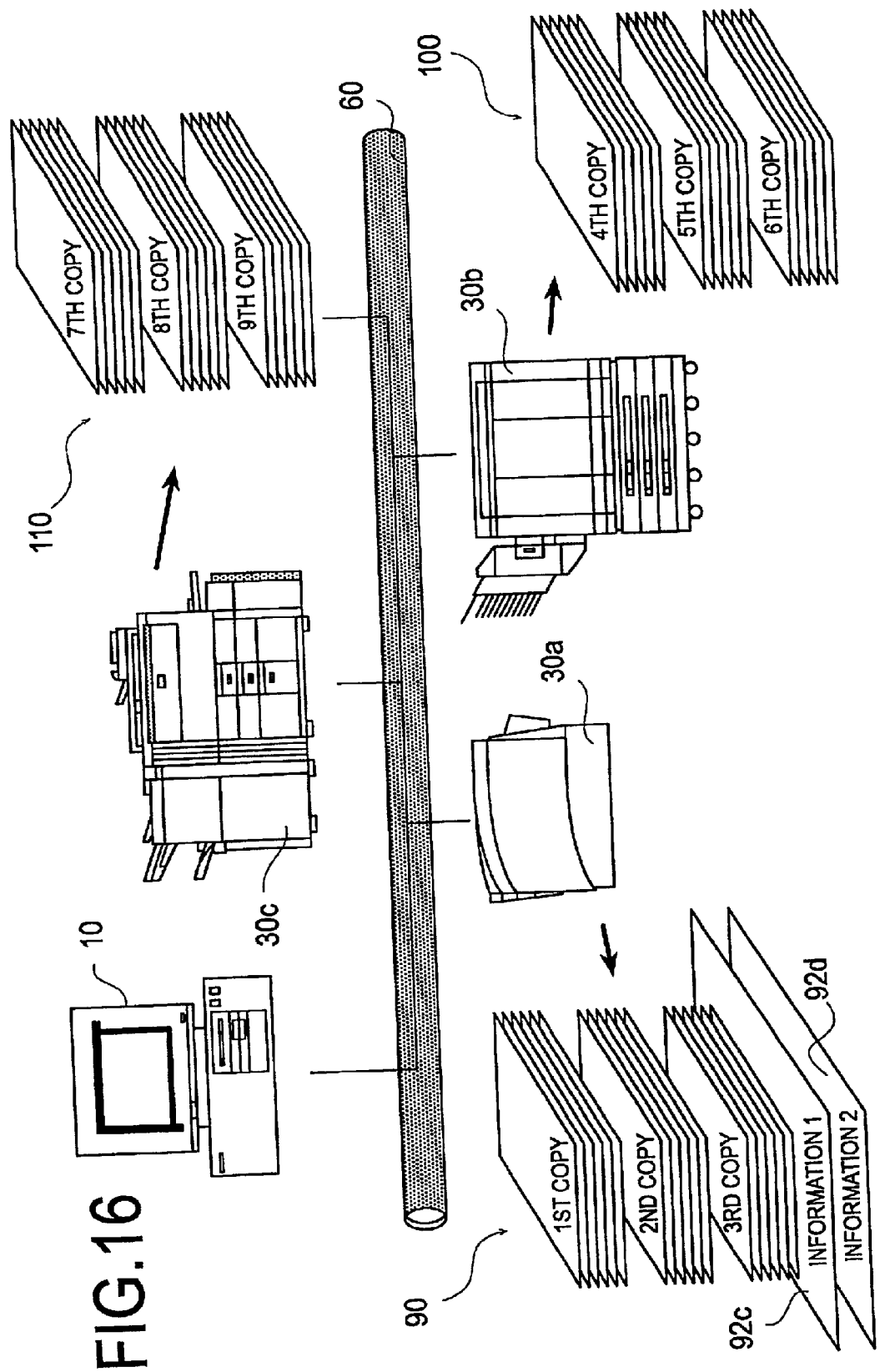
FIG. 16 is a diagram showing a specific example corresponding to the third embodiment where a printer divides and transfers a print job by number of copies.

FIG. 16 is a diagram showing an example corresponding to the third embodiment where a printer divides and transfers a print job to other printers by number of copies.

The PC 10 sends a print job, which is instructed to be printed in multiple copies, to the printer 30a. In the case shown in FIG. 16, the printer 30a receives the print job as a job that needs nine copies. The printer 30a divides the print job by number of copies according to the prescribed condition shown in the first and second embodiments. The process of dividing a print job by number of copies to be made is used as a means of expediting the completion of the printing. The print job is divided by number of copies and the pages divided by number of copies are transferred to the other printers 30b and 30c.

In case of the job shown in FIG. 16, wherein nine copies are to be made, the job of printing the pages of the fourth through sixth copies is transferred to the other printer 30b. The job of printing the pages of the seventh through ninth copies is transferred to the other printer 30c. As a result of printing the jobs, the printers 30b and 30c discharge the printed items 100 and 110. The pages of the first through third copies that are left without being transferred is printed by the printer 30a and discharged as a printed item 90.

The printer 30a insert-prints 92c and 92d at places where the pages that were transferred to the other printers 30b and 30c. Specifically, a transfer destination guide map 92c is inserted in place of the pages of the transferred fourth through sixth copies immediately after printing the third copy. Immediately following the same, a transfer destination guide map 92d is inserted in place of the pages of the transferred seventh through ninth copies.

Thus, it is possible to conduct the process of insert-printing the location information of the transfer destination in case of transferring pages divided by number of copies.

Figure 17:
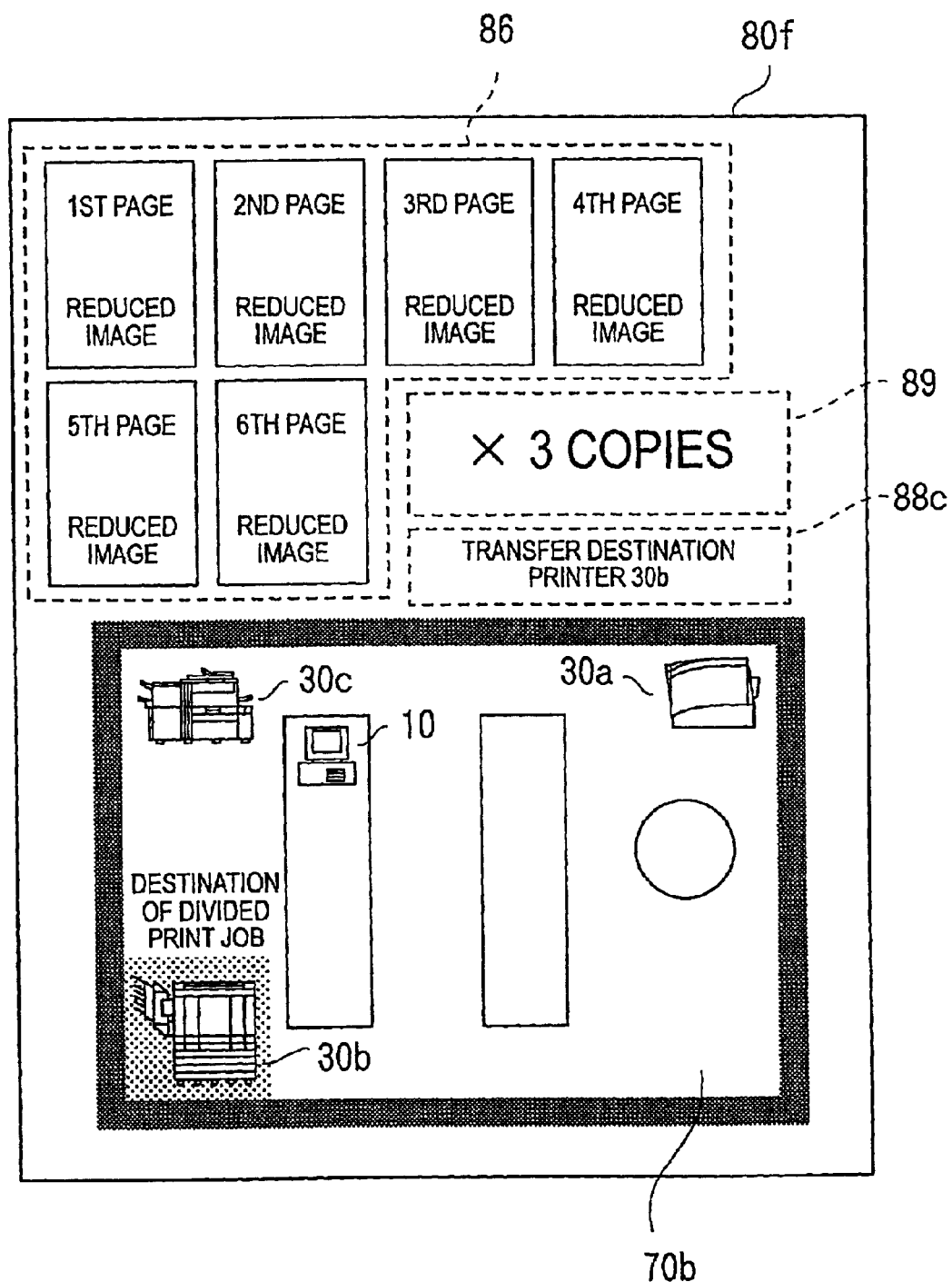
FIG. 17 a diagram showing an example of an insertion-printed page in the third embodiment where pages divided by number of copies are transferred.
Figure 18:
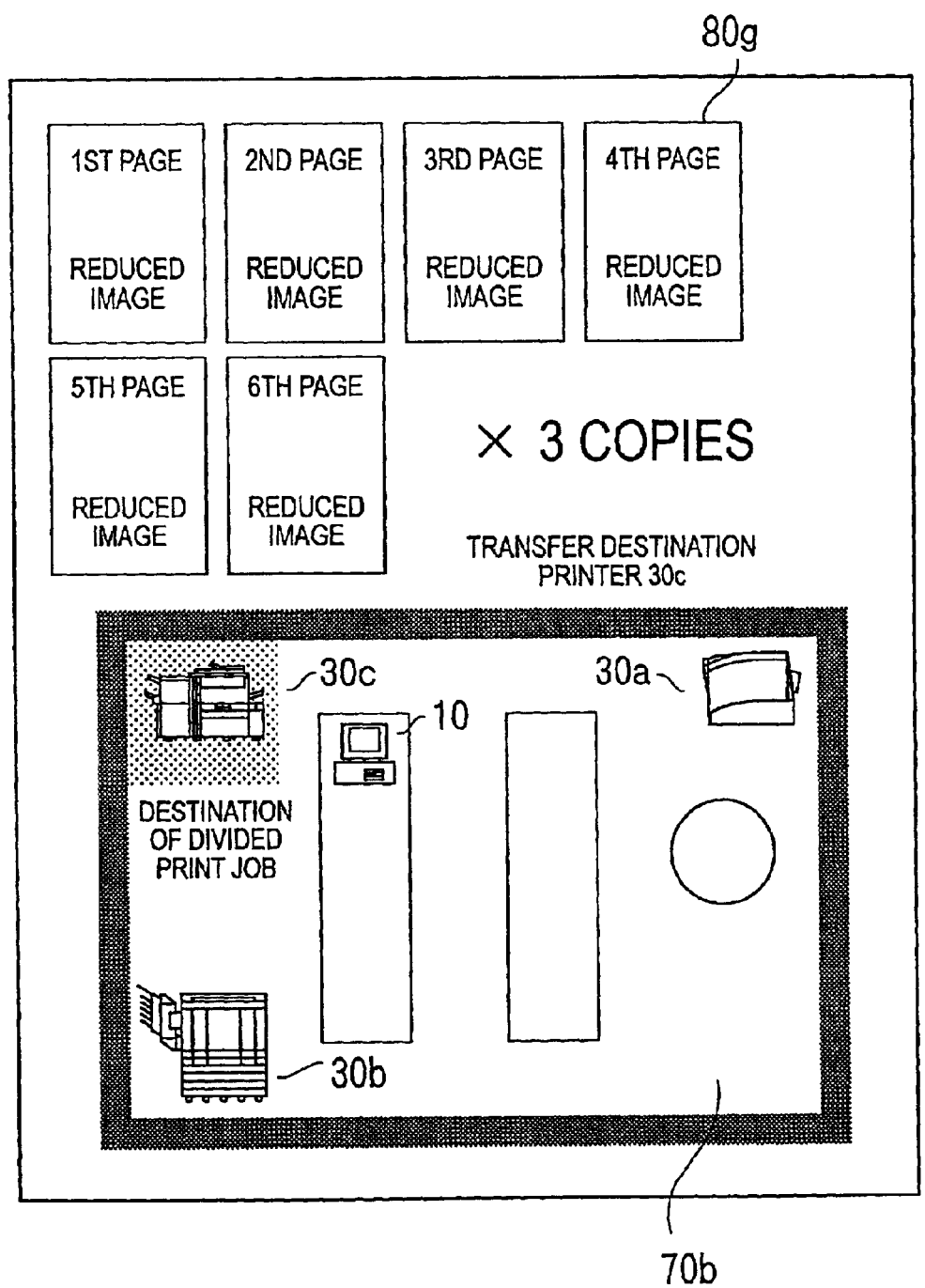
FIG. 18 a diagram showing another example of an insertion-printed page in the third embodiment where pages divided by number of copies are transferred.

FIG. 17 and FIG. 18 show the insert-printed pages in case of transferring pages divided by number of copies.

As it is obvious from FIG. 17, it is preferable to print the reduced images 86 of the transferred pages. A transfer destination guide map 70b is printed with the name of the transfer destination 88c and the location information of the transfer destination printer. Moreover, the number of copies 89 indicating the number of copies transferred to the transfer destination is printed.

As the contents shown in FIG. 18 are similar to the case shown in FIG. 17, the detailed description is omitted here.

Figure 19:
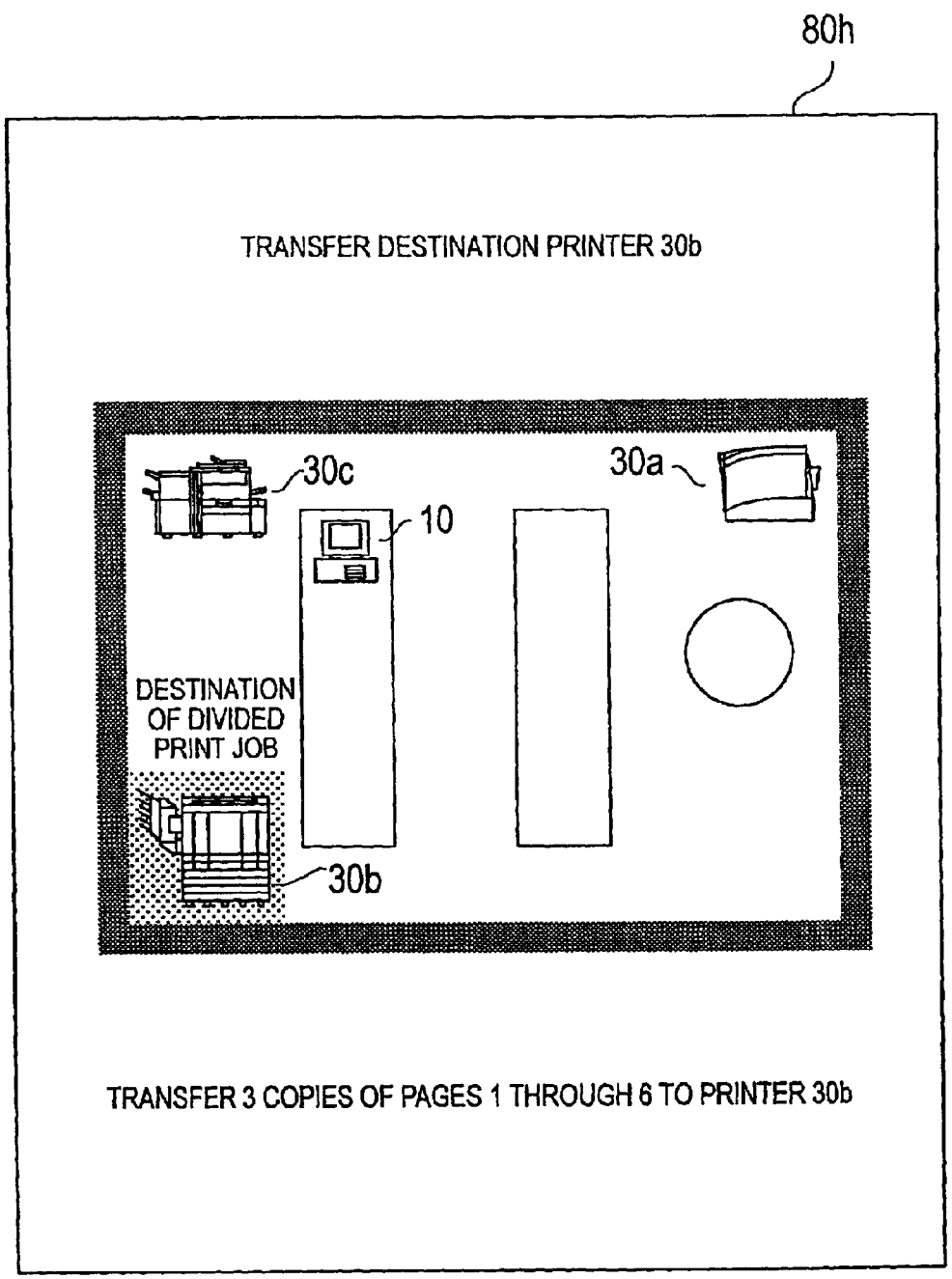
FIG. 19 a diagram showing an example of another insertion-printed page in the third embodiment where pages divided by number of copies are transferred.
Figure 20:
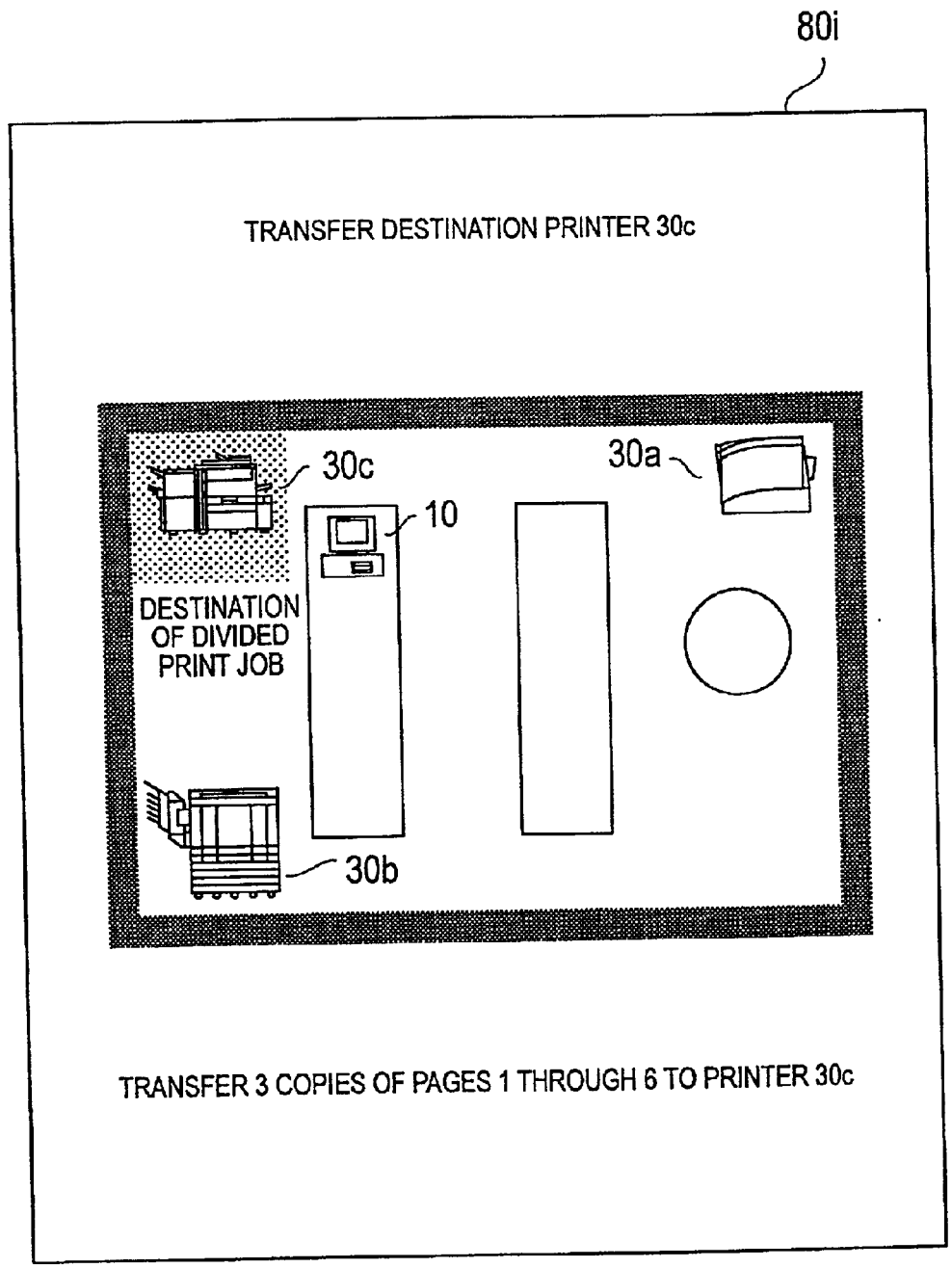
FIG. 20 is a diagram showing another example of another insertion-printed page in the third embodiment where pages divided by number of copies are transferred.

The format of insert printing the transfer destination location information is not limited to those shown in FIG. 17 and FIG. 18. For example, it is possible to print the number of pages included in each copy, the number of copies transferred and the name of the transfer destination device concisely instead of printing the reduced image of each page as shown in FIGS. 19 and 20.

As can be seen from the above description, in performing a divided printing by transferring a portion of the pages of the received print job to multiple transfer destinations on the network 70, the printer according to this embodiment enables us to insert-print the location information of the transfer destination at a page position where the transferred pages existed, so that the user can instantaneously confirm the page position where the transferred pages existed.

Also, above-mentioned insertion printing is preferably done on a size of paper different from the size of other pages, so that it becomes easier to advise the user of any missing pages if there are any when the pages are transferred.

Fourth Embodiment

The fourth embodiment relates to a printer that prints by relating the page numbers of the transferred pages with the location information of the transfer destinations. Different from the third embodiment, this embodiment is applicable to cases where no insertion printing is performed.

Since the constitution of the network system in this embodiment including the PC 10, printer 30a–30d, digital copying machine 40 and facsimile machine 50 is identical to that shown in FIG. 1 and FIG. 2 in the first embodiment, the detail descriptions are not repeated here. Identical members are identified using the same reference codes.

For the sake of the simplicity, it is described that the PC 10 specifies the printer 30a, and the printer 30a transfers a portion of the print job it received to the printers 30b and 30c.

Figure 21:
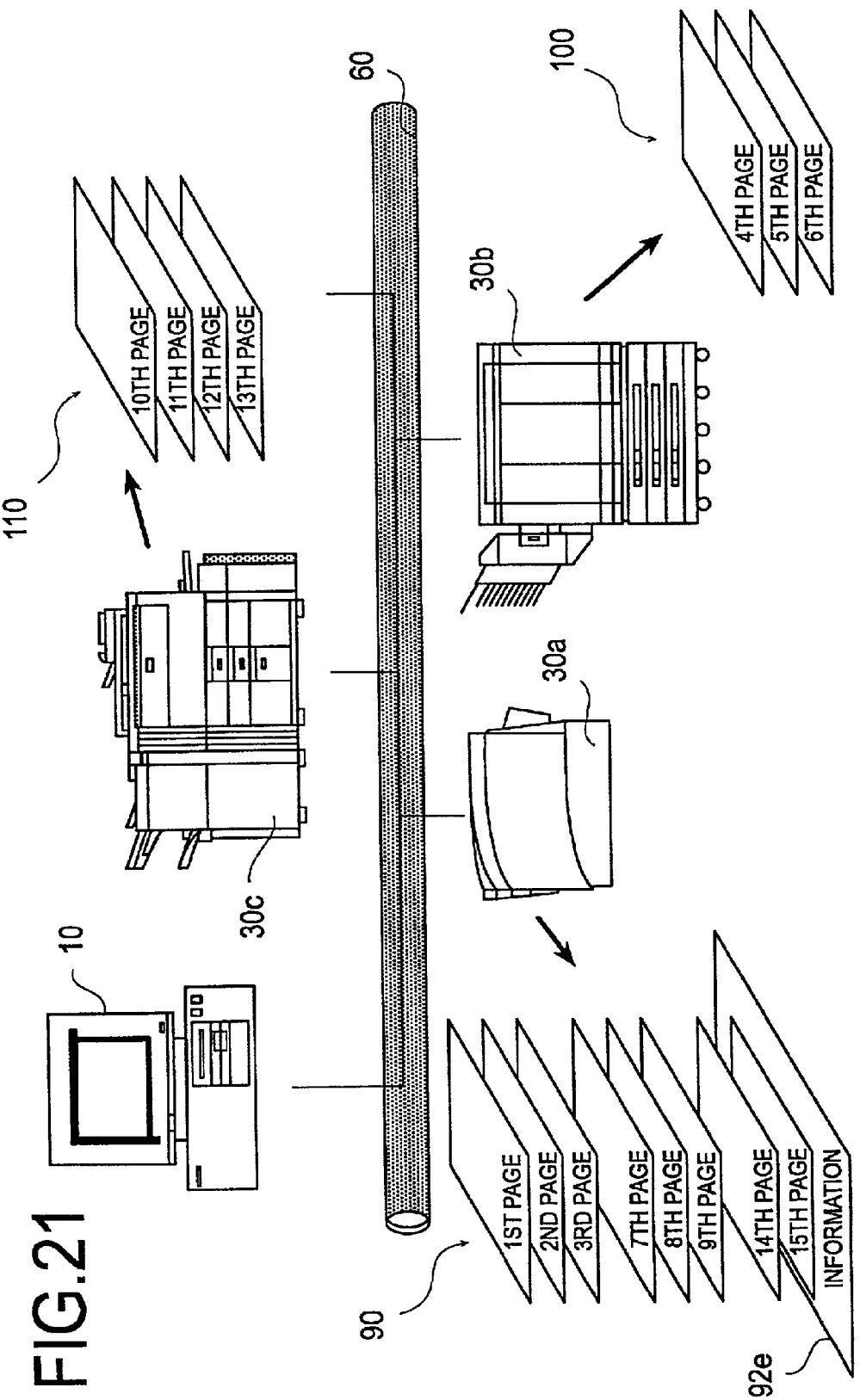
FIG. 21 is a diagram showing a specific example corresponding to a fourth embodiment where a printer divides and transfers a print job by page.

FIG. 21 is a diagram for describing the contents of the process in a case corresponding to the fourth embodiment, where a printer divides the received print job by page and transfers them to other printers.

The contents of the print job that the printer 30a receives and the pages that are transferred to the other printers 30b and 30c are the same as in the case shown in FIG. 9.

It is not necessary to prepare a transfer destination guide map each time when the transfer destination of the divided print job changes. The location information of each transfer destination of the print job can be shown in one transfer destination guide map.

Figure 22:
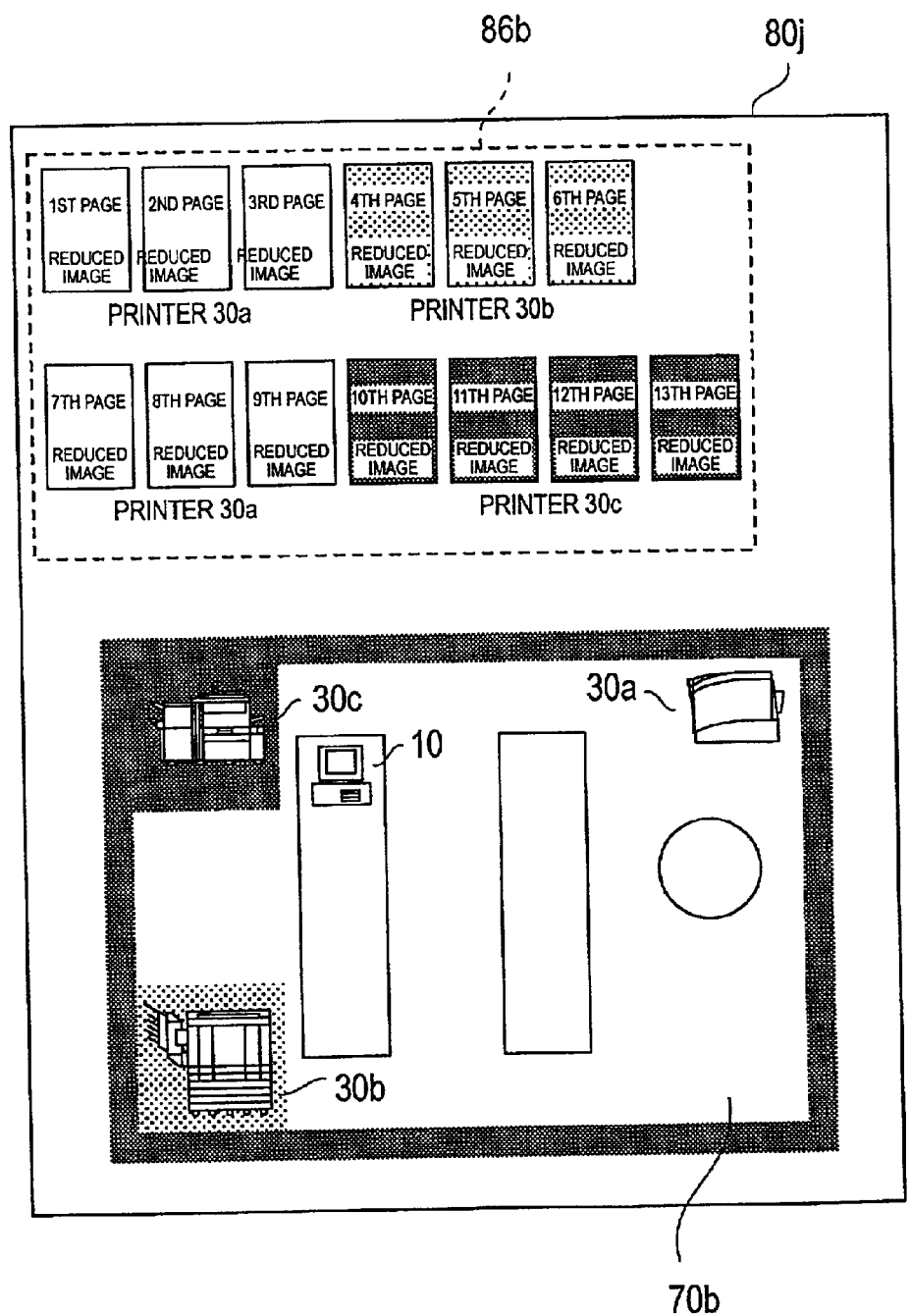
FIG. 22 is an example of a transfer destination guide map printed in the fourth embodiment.

FIG. 22 shows a specific example of the page of the transfer destination guide map in case of the fourth embodiment.

As can be seen from FIG. 22, the reduced images 86b of the pages, the page numbers, and the name of the transfer destination device for each page, and the transfer destination guide map are printed.

In the case shown in FIG. 22, the reduced images of the page 1 through page 3, their page numbers (pages 1 through 3), and the name of their transfer destination device, i.e., the printer 30b, are printed correlatively. The reduced images of the page 4 through the page 6, their page number (pages 4 through 6), and their transfer destination, i.e., the printer 30b, are printed correlatively as well. Also, the reduced images of the page 7 through page 9, their page numbers (pages 7 through 9), and the name of their transfer destination device, i.e., the printer 30c, are printed correlatively.

Figure 23:
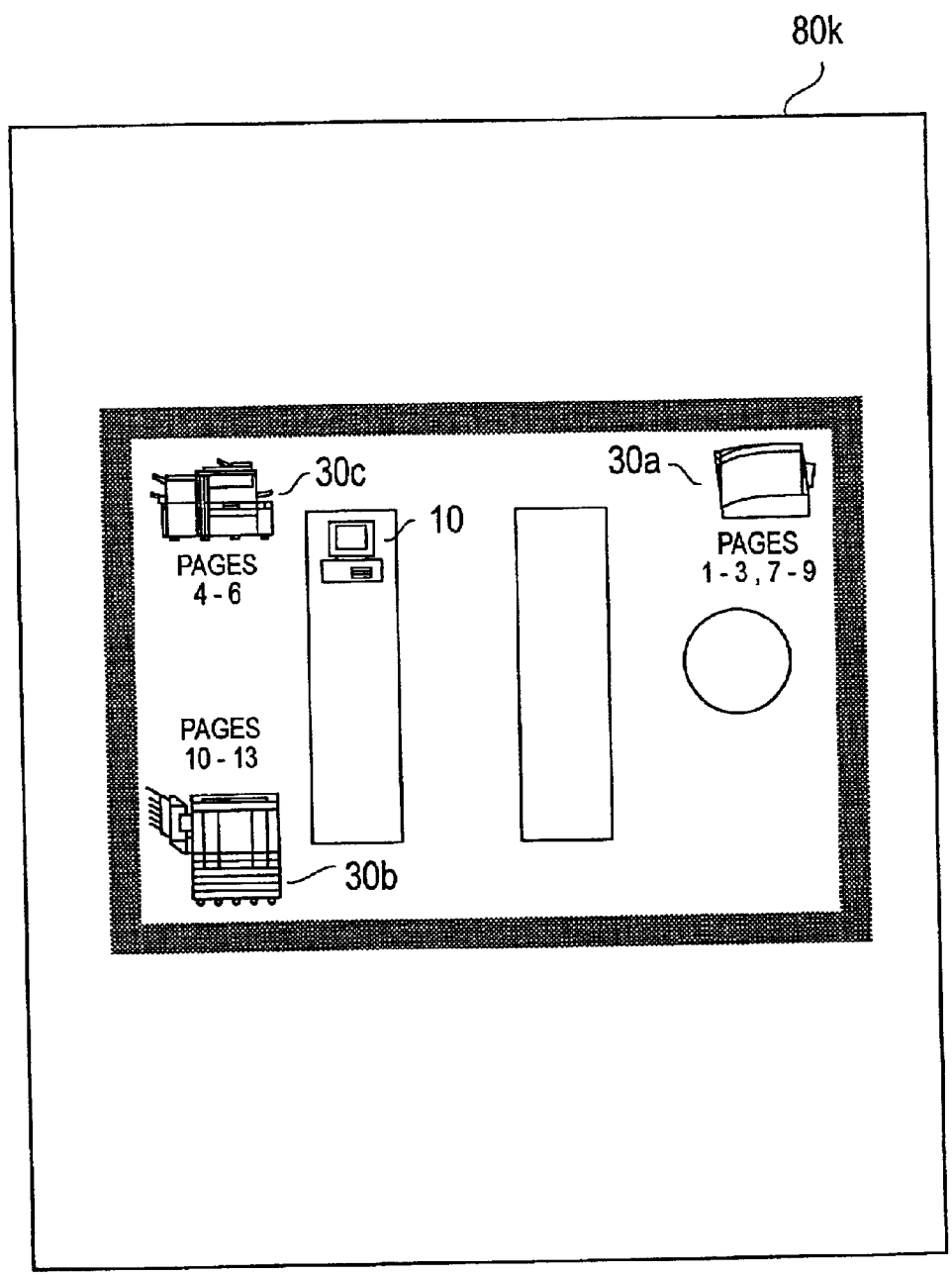
FIG. 23 is another example of a transfer destination guide map printed in the fourth embodiment.

The format of printing location information of the transfer destination is not limited to the one shown in FIG. 22. It is possible to omit the printing of the reduced images of the pages as shown in FIG. 23. In the case shown in FIG. 23, the transfer page number and the transfer location shown on the transfer destination guide map are printed in such a way as to mutually correlate them.

Figure 24:
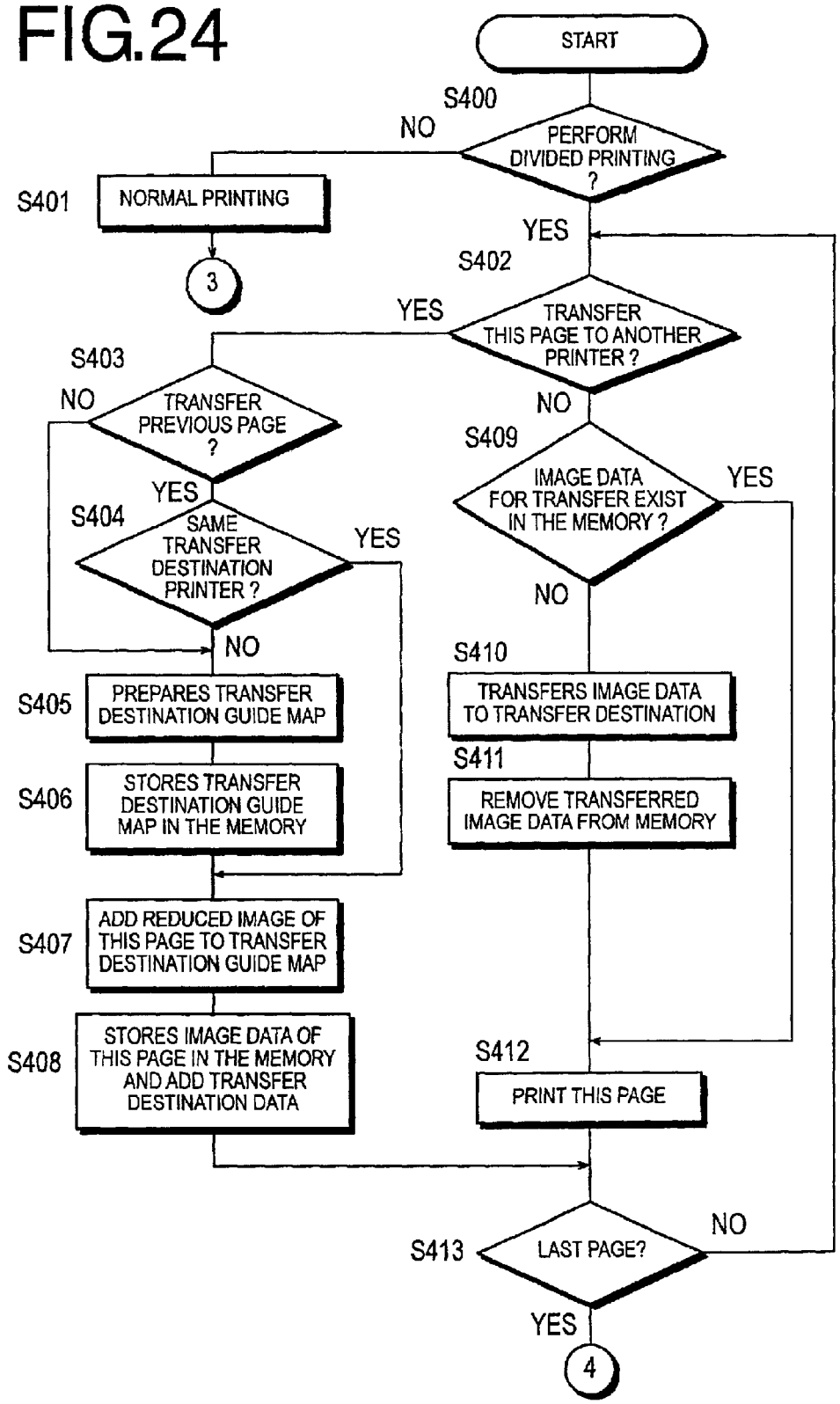
FIG. 24 is a flowchart showing the operation of a printer corresponding to the fourth embodiment.
Figure 25:
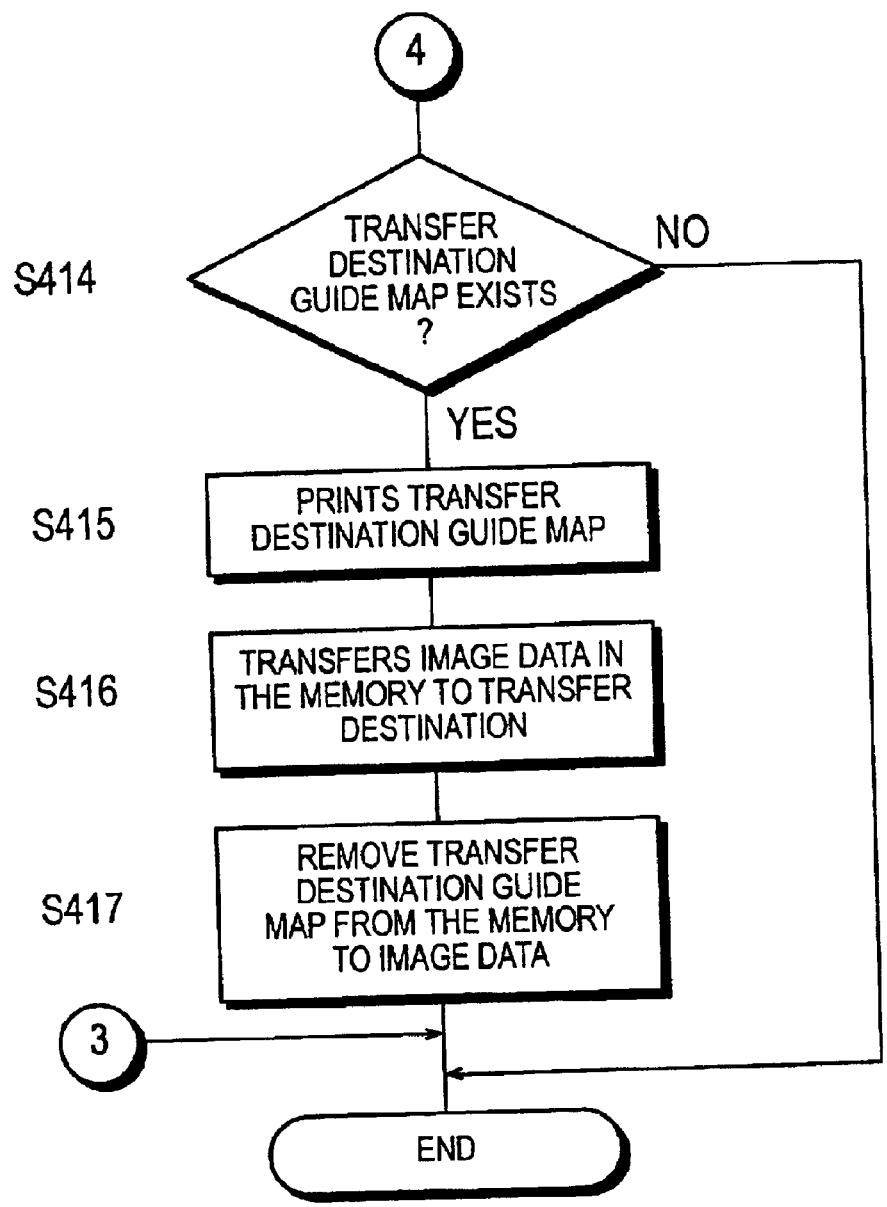
FIG. 25 is a flowchart that continues from FIG. 24.

FIGS. 24 and 25 show a flowchart to show the operation of the printer 30a that corresponds to the fourth embodiment. The algorithm shown in the flowchart of FIGS. 24 and 25 is stored as a program in the ROM 32 of the printer 30a and is executed by the CPU 31.

Since the process of the steps S400 through S408 are similar to those of the aforementioned steps S300-S308 shown in FIG. 14, the descriptions are not repeated here.

At the step S409, a judgment is made whether the image data of the page to be transferred is temporarily stored in the RAM 33 as a process in case a page in question is not to be transferred. If the page to be transferred is temporarily stored in the RAM 33 (S409: Yes), the process of the step S410 is executed, while the step S412 is executed if it is not stored (S409: No).

At the step S410, the image data of the transferred pages and the printing condition temporarily are transferred as the divided print jobs to the transfer destination printers 30b and 30c.

At the step S411, the image data temporarily stored are removed from the RAM 33.

At the step S412, the printer 30a prints the page that is judged not to be transferred at the step S402.

At the step S413, a judgment is made whether the page in question is the last page. If the page in question is not the last page (S413: No), it returns to the process of the step S402, and a judgment is made whether the page is to be transferred to the other page 30b or 30c. If the page in question is the last page (S413: Yes), the process of the step S414 shown in FIG. 25 is executed.

At the step S414, a judgment is made whether the transfer destination guide map prepared in the steps S405 through S408 is temporarily stored in the RAM 33. If the transfer destination guide map is stored in the RAM 33 (S414: Yes), the process of the step S415 is executed, while the process is terminated if it is not stored (S414: No).

At the step S415, the contents of the transfer destination guide map 70b are finalized, and the transfer destination guide map 70b as well as the reduced images 86b and the transfer destination device name are printed. In this case, the transfer page numbers and the transfer location are printed correlatively.

At the step S416, the printing condition and the image data of the pages to be transferred temporarily stored in the RAM 33 are transferred as a divided print job to the transfer destination devices, i.e., the printers 30b and 30c.

At the step S417, the transfer destination guide map and the image data of the pages to be transferred temporarily stored in the RAM 33 are removed and the memory area is initialized.

Therefore, the location information concerning all the transfer print jobs is combined and printed on one page in this embodiment, different from the third embodiment shown in FIG. 14 and FIG. 15.

It is possible to divide a print job by number of copies in this embodiment as well as in the third embodiment.

Figure 26:
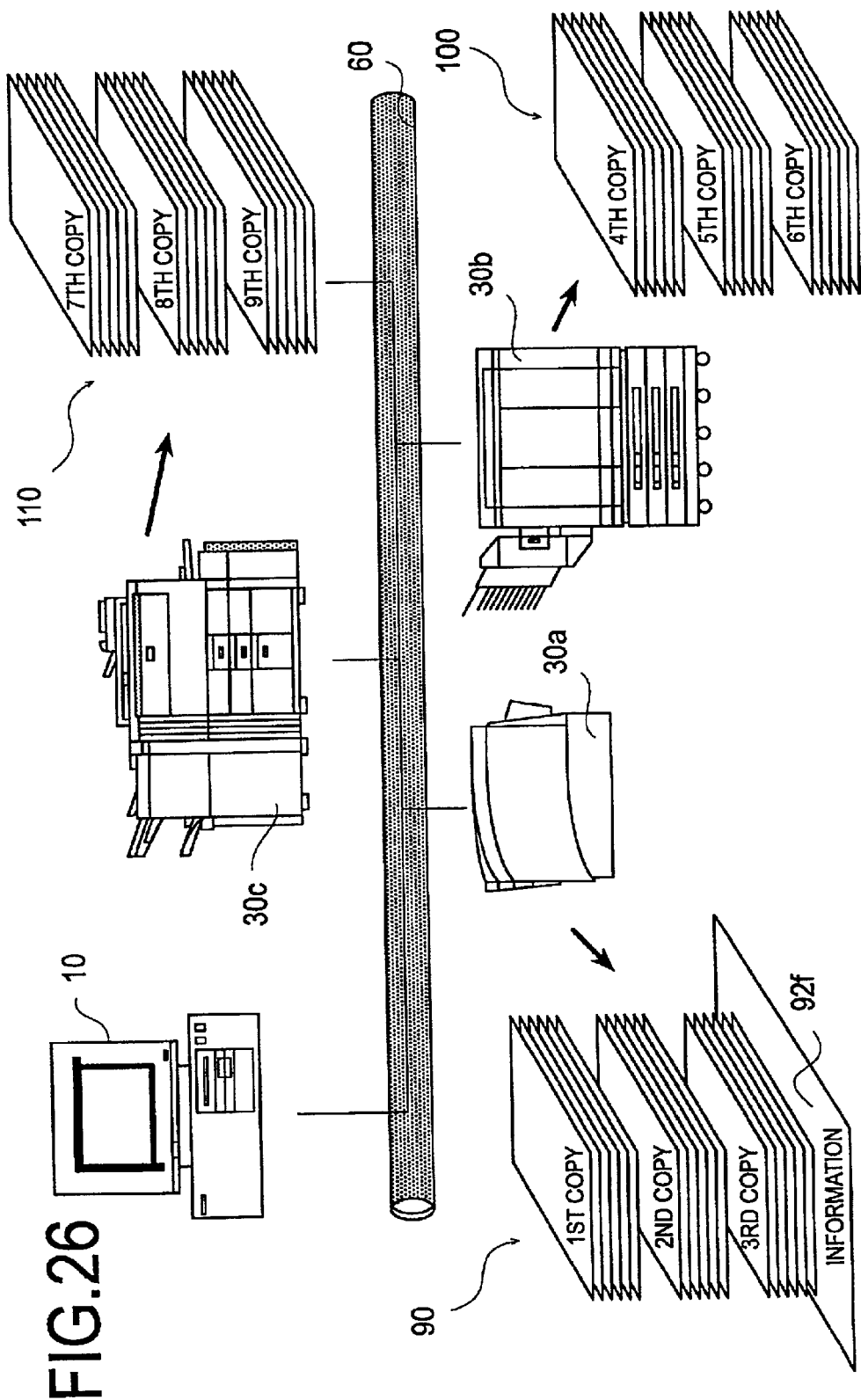
FIG. 26 is a diagram showing a specific example corresponding to the fourth embodiment where a printer divides and transfers a print job by number of copies.

FIG. 26 is a diagram showing a specific example corresponding to the fourth embodiment where a printer divides and transfers a print job by number of copies. FIG. 26 shows, similar to FIG. 16, the process of a case where the printer 30a receives a print job that requires nine copies.

The specified printer 30a divides the print job by number of copies transmitting the fourth through sixth copies to the printer 30b, while transmitting the seventh through ninth copies to the printer 30c. In a case like this where the print job is transferred to different printers dividing by number of copies, a transfer destination guide map can be printed added with the transfer destination location information as well.

Figure 27:
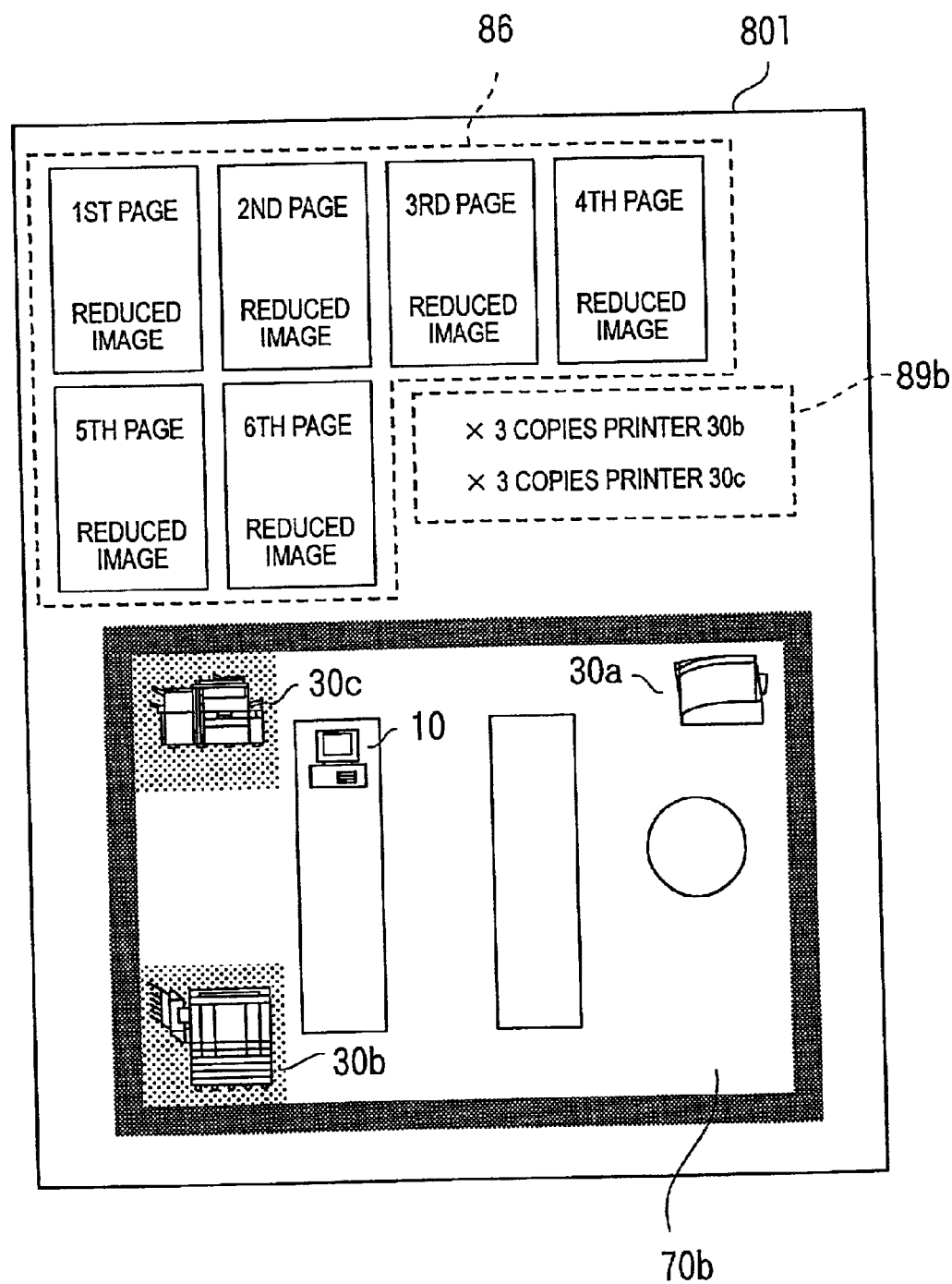
FIG. 27 is a diagram showing an example of a page of the transfer destination guide map printed when transferring pages divided by number of copies in the fourth embodiment.

FIG. 27 is a specific example of a transfer destination guide map in case of transferring the pages divided by number of copies in the fourth embodiment.

As can be seen from FIG. 27, the reduced images 86 of the transferred pages are printed. Also, the two transfer destinations, i.e., the printers 30b and 30c, are shown together on the transfer destination guide map. Correlated with the transfer destination location information, the number of copies transferred to each of the printers 30b and 30c. When the pages are transferred by number of copies, all the pages included in one copy are transferred. Therefore, it is possible to print all the page numbers and the transfer destinations correlatively.

Figure 28:
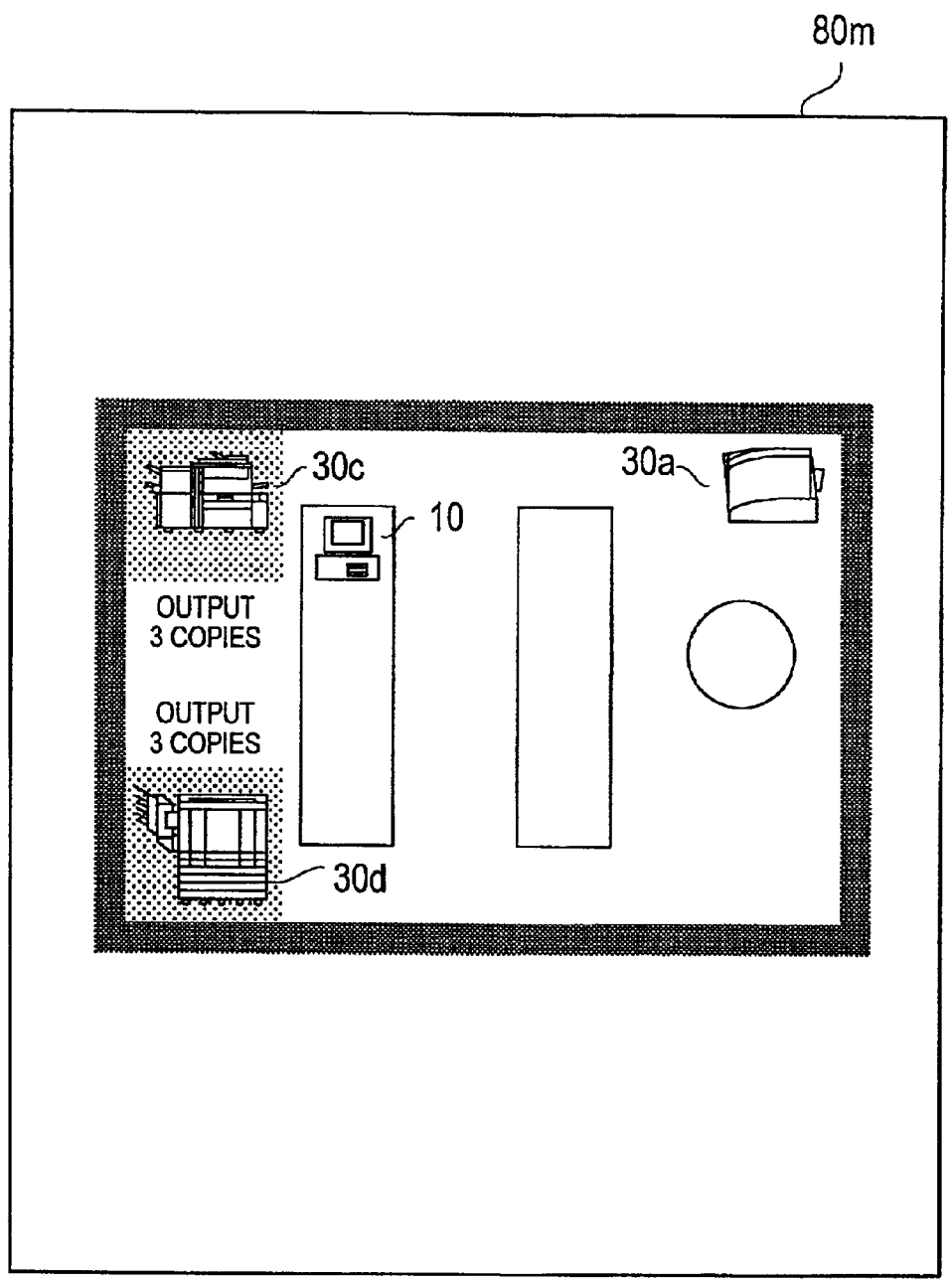
FIG. 28 is a diagram showing another example of a page of the transfer destination guide map printed when transferring pages divided by number of copies in the fourth embodiment.

It is also possible in a case of transferring by number of copies, however, to use a format wherein the individual page numbers are not printed, as it is possible to indicate that all the pages included in a copy are transferred by adding information 89b of the number of copies transferred. It is also possible to omit printing of the reduced images of the pages as shown in FIG. 28.

Although several preferred embodiments of the invention were described in the above, the invention may be embodied in other specific forms without departing from the spirit or essential characteristics thereof.

Figure 29:
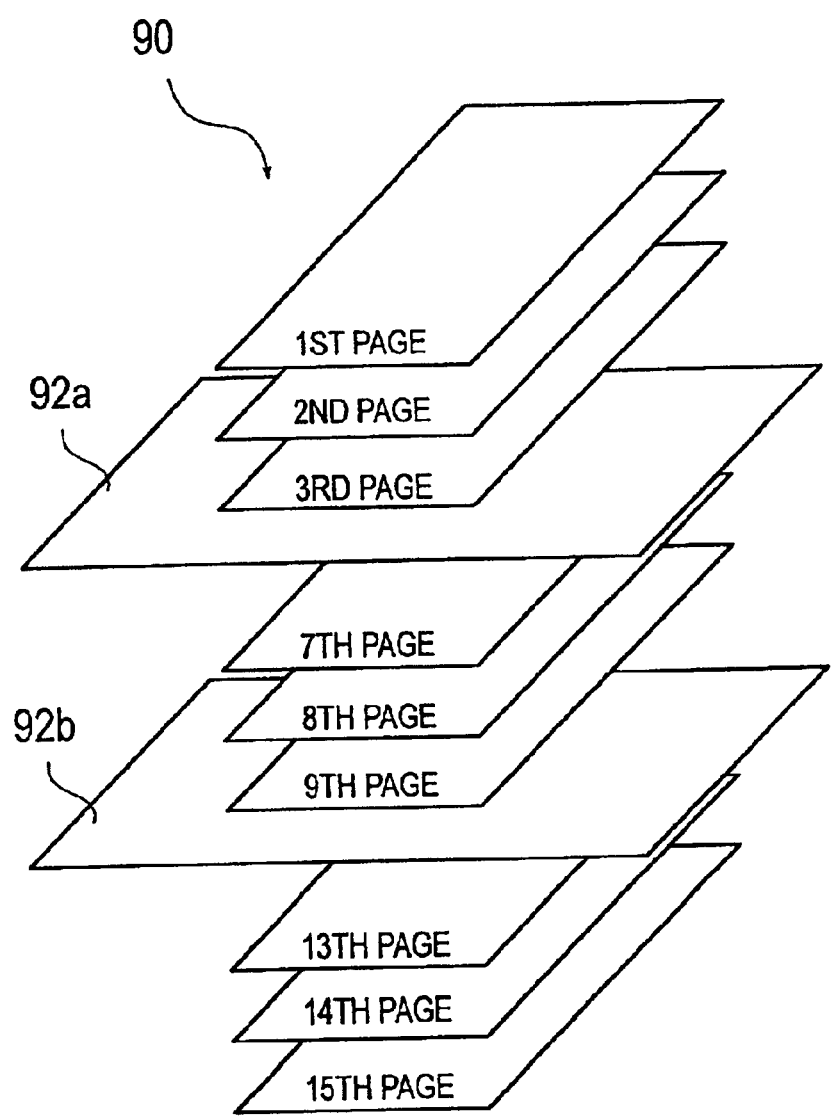
FIG. 29 is a diagram showing an example of printing a transfer destination guide map when it is printed on a page of an orientation different from other pages.

Although it was indicated to print the transfer destination location information on a sheet of paper larger than regular pages to alert the user that the transfer destination guide map is printed in the third and fourth embodiments, the invention is not limited to that. For example, it is possible to print the location information of the transfer destination, e.g., the transfer destination guide map that shows the transfer destination location information, on a sheet of paper with an orientation different from that of other pages as shown in FIG. 29. What is meant by "an orientation different from that of other pages" means that the orientation of the sheet is different from that of other pages relative to the direction of paper transport, while the sheet size can be the same.

Figure 30:
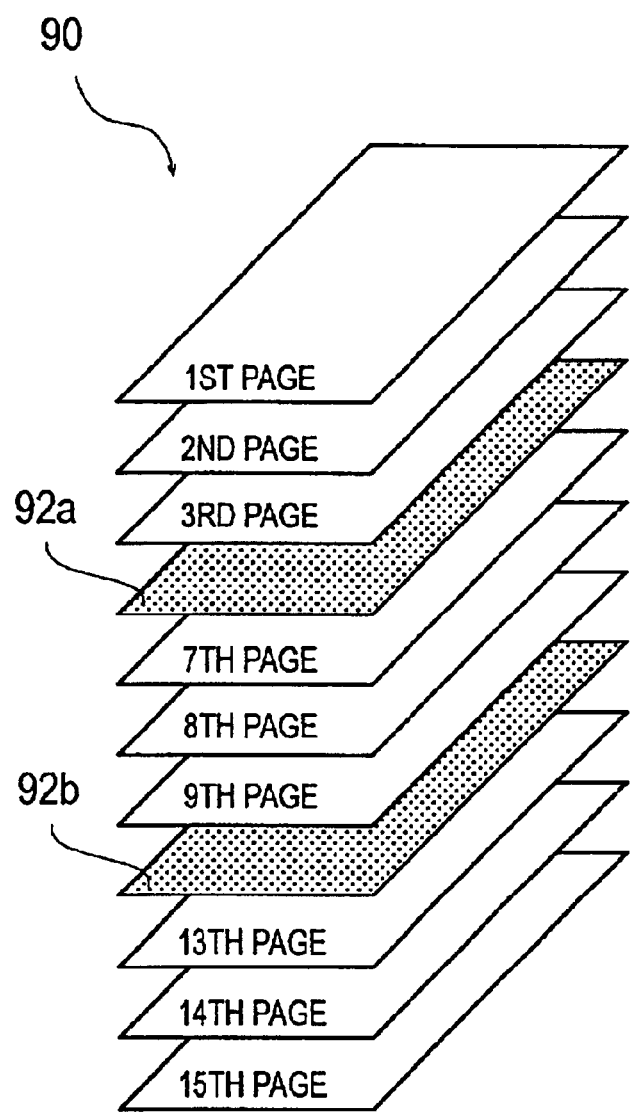
FIG. 30 is a diagram showing an example of printing a transfer destination guide map when it is printed on a page of a color different from other pages.

It is also possible to print the location information of the transfer destination on a sheet of paper with a color different from that of other pages as shown in FIG. 30. Moreover, it is also possible to print the location information of the transfer destination on a sheet of paper with characteristics different from that of other pages, e.g., a sheet of paper made of a material different from the material of other pages.

In case of printing the transfer destination location information on a sheet of paper with characteristics different from that of other pages, the image forming device is constituted as follows.

Multiple paper cassettes are provided to be able to store paper of different sizes, directions and colors. In order to print the transfer destination location information as described above, the system selects a paper cassette, which is different from the cassette used for printing other pages. Paper from the selected cassette is transported.

It is also possible to print the transfer destination location information using colors different from the colors used for printing other pages. For example, when other pages are printed in black and white, the transfer destination location information can be printed in full colors or a mono color. It is also possible to print the transfer destination location information in by adding colors to the background. It is also possible to add letters and watermarks in the background or adding identification marks in a specific are of the page, e.g., the right or left top corner.

Although it is preferable to print the transfer destination location information on a sheet of paper with characteristics or in a format different from those of other pages of a print job, the invention is not limited to it and includes a case where the transfer destination location information is printed on a sheet of paper with characteristics not different from those of other pages.

Although it was described in the above cases where the invention is applied to printers where printing is performed by receiving a print job from a computer, the invention is not limited to it but can be applied to digital copying machines as well. It can also be applied to a case where image data are obtained by scanning documents by a scanner and printed by multiple printers by dividing the job.

Figure 31:
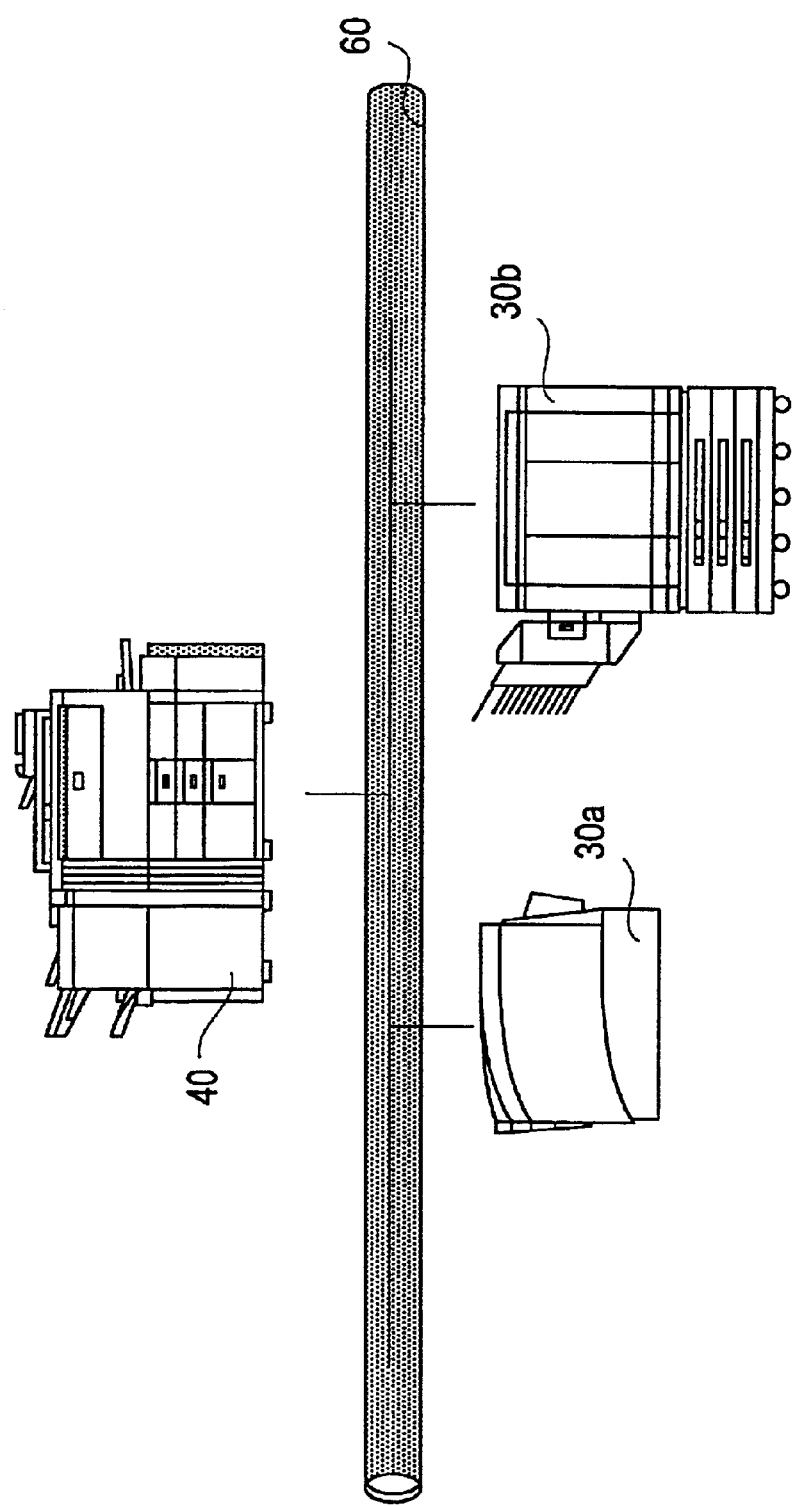
FIG. 31 is a diagram showing a connection example for a digital copying machine to which the invention is applied.

FIG. 31 is a case where the invention is applied to a digital copying machine that can work as a printer.

The digital copying machine 40 obtains image data by scanning documents. The user sets up the copying condition by operating the operating panel. A copy job is thus prepared from the image data and the copying condition. A portion of the copy job is transferred to other printers 30a and 30b. In this case, the location information of the transferred destination is insert-printed at the location where the transferred pages existed.

Figure 32:
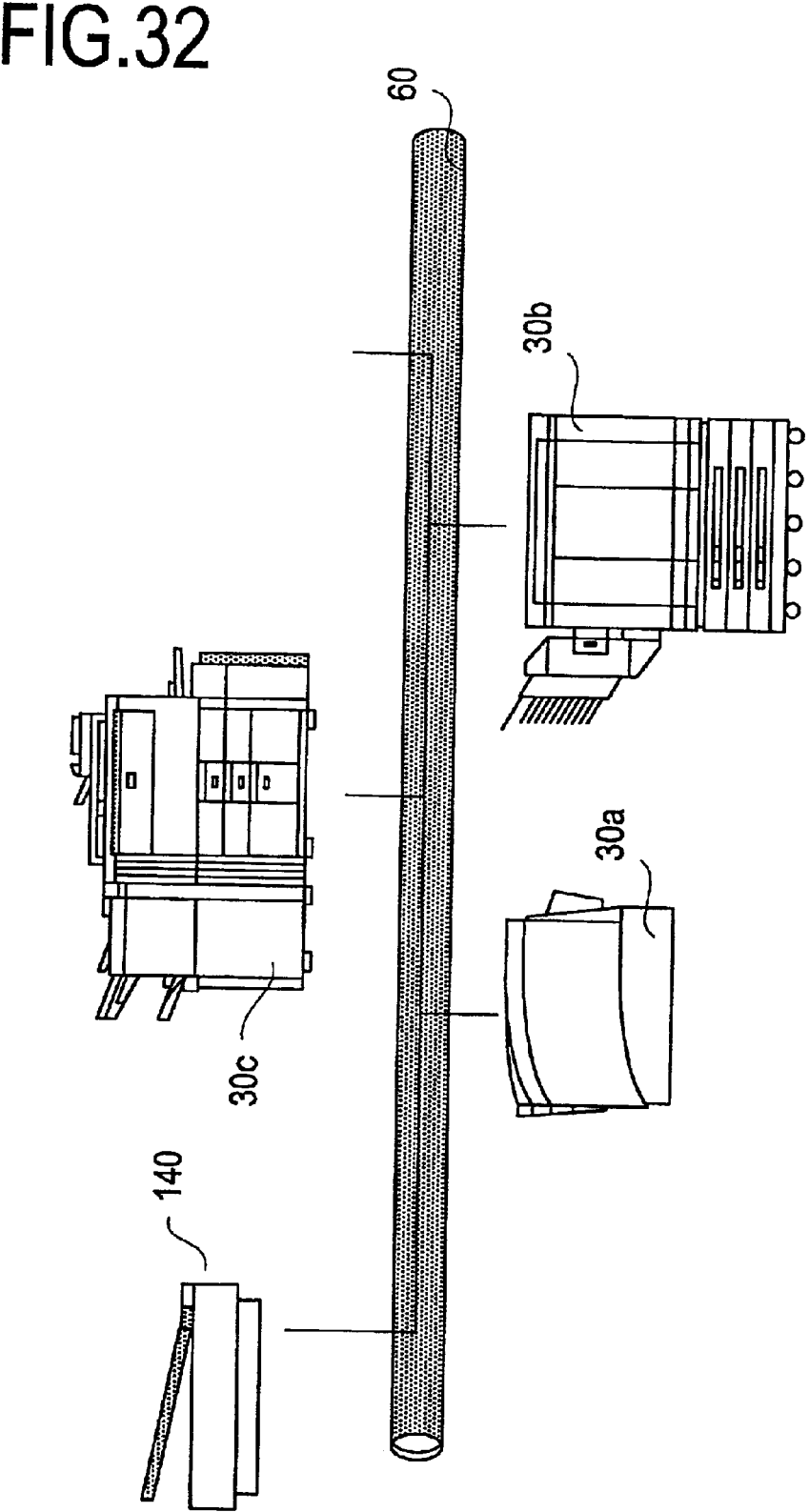
FIG. 32 is a diagram showing a connection example when multiple printers print image data obtained by a scanner.

FIG. 32 shows a case where the invention is applied to a print job, in which an image data obtained by scanning the document with the scanner is divided up and printed on multiple printers.

The scanner 140 scans the document to obtain the image data. When a sheet feeder is used to scan multiple pages of documents, it creates an image data of multiple pages of images. This image data of multiple pages is divided up and transferred to the printers 30a, 30b and 30c. A default printer (e.g., 30a) is selected among the printers 30a, 30b and 30c. The printer 30a selected as the default printer can insert-print a transfer destination guide map containing the transfer destination location information on the pages where the pages that are transferred to printers 30b and 30c existed.

The control method of this invention can be executed by a processor such as a CPU executing a program that contains algorithms such as those shown in FIGS. 3, 8, 14, 15, 24 and 25. The program can be provided stored in computer readable recording media (e.g., floppy disks, CD-ROMs, etc.). This specified program can also be provided as an application software that executes above-mentioned processes or in a format built into the software of the printer 30 or copying machine 40 as a part of the function of the printer 30 or copying machine 40. The computer program product claimed includes the program itself, the recording media that stores the program, and devices that operate based on the program installed in them.

What is claimed is:

1. An image forming device connected to a network comprising:
    an interface receiving a print job;
    a memory storing location information of one or more other devices connected with said device via the network;
    a processor executing a process of transferring a portion of or all of the received print job to one or more transfer destinations of the other devices; and
    a printing unit printing location information of said transfer destinations to which the print job is transferred;
    wherein said processor divides the received print job and transfers a portion of the print job obtained as a result of the division; and
    said printing unit prints location information, using insert printing, of said transfer destinations to which the print job is transferred in place of pages that correspond to the portion of the print job that is transferred.

2. The image forming device according to the claim 1, wherein said processor divides the received print job and transfers a portion of the print job as a result of the division.

3. The image forming device according to the claim 2, wherein said processor divides the received print job into printable pages and non-printable pages in said image forming device, and transfers the non-printable pages among the received print job.

4. The image forming device according to the claim 2, wherein said processor divides the received print job into color image pages and monochromatic image pages, and transfers either the color pages or the monochromatic pages among the received print job.

5. The image forming device according to the claim 2, wherein said processor divides the received print job according to page sizes, and transfers the pages of at least one size among the received print job.

6. The image forming device according to the claim 2, wherein said printing unit prints location information of said transfer destinations on a sheet of paper with one or more characteristics that are different from those of other pages of the print job.

7. The image forming device according to the claim 6, wherein said printing unit prints location information of said transfer destinations on a sheet of paper of a size that is different from that of other pages of the print job.

8. The image forming device according to the claim 6, wherein said printing unit prints location information of said transfer destinations on a sheet of paper of a color that is different from that of other pages of the print job.

9. The image forming device according to the claim 6, wherein said printing unit prints location information of said transfer destinations on a sheet of paper with an orientation that is different from that of other pages of the print job.

10. The image forming device according to the claim 2, wherein said printing unit prints location information of said transfer destinations in a color that is different from that of other pages of the print job.

11. The image forming device according to the claim 2, wherein said printing unit prints location information of said transfer destinations adding a mark that is different from that of other pages of the print job.

12. The image forming device according to the claim 2, wherein said processor divides the received print job by page and transfers it.

13. The image forming device according to the claim 2, wherein said processor divides the received print job by number of copies and transfers it.

14. The image forming device according to the claim 1, further comprising an error detecting sensor, wherein said processor transfers a portion or all of the received print job when an error is detected.

15. The image forming device according to the claim 14, wherein the error detected by said sensor is toner emptiness.

16. The image forming device according to the claim 14, wherein the error detected by said sensor is paper emptiness.

17. The image forming device according to the claim 1, further comprising a font memory, wherein
said processor transfers a portion or all of the received print job when a font specified in the received print job is not stored in said font memory.

18. The image forming device according to the claim 1, wherein said printing unit prints the location information of said transfer destinations on a sheet of paper with one or more characteristics that are different from those of other pages of the print job.

19. The image forming device according to the claim 18, wherein said printing unit prints the location information of said transfer destinations on a sheet of paper of a size that is different from that of other pages of the print job.

20. The image forming device according to the claim 18, wherein said printing unit prints the location information of said transfer destinations on a sheet of paper with a color that is different from that of other pages of the print job.

21. The image forming device according to the claim 18, wherein said printing unit prints the location information of said transfer destinations on a sheet of paper with an orientation that is different from that of other pages of the print job.

22. The image forming device according to the claim 1, wherein said printing unit prints the location information of said transfer destinations in a color that is different from that of other pages of the print job.

23. The image forming device according to the claim 1, wherein said printing unit prints location information of said transfer destinations adding a mark that is different from that of other pages of the print job.

24. The image forming device according to the claim 1, wherein said processor divides the received print job by page and transfers it.

25. The image forming device according to the claim 1, wherein said processor divides the received print job by number of copies and transfers it.

26. An image forming device connected to a network comprising:
an interface receiving a print job;
a memory storing location information of one or more other devices connected with said device via the network;
a processor executing a process of transferring a portion of or all of the received print job to one or more transfer destinations of the other devices; and
a printing unit printing location information of said transfer destinations to which the print job is transferred;
wherein said printing unit prints a map showing said transfer destinations to which the print job is transferred.

27. The image forming device according to the claim 26, wherein said processor divides the received print job and transfers a portion of the print job as a result of the division.

28. The image forming device according to the claim 27, wherein said processor divides the received print job into printable pages and non-printable pages in said device, and transfers the non-printable pages among the received print job.

29. The image forming device according to the claim 27, wherein said processor divides the received print job into color image pages and monochromatic image pages, and transfers either the color pages or the monochromatic pages among the received print job.

30. The image forming device according to the claim 27, wherein
said processor divides the received print job according to page sizes, and transfers the pages of at least one size among the received print job.

31. The image forming device according to the claim 27, wherein said printing unit prints location information of said transfer destinations on a sheet of paper with one or more characteristics that are different from those of other pages of the print job.

32. The image forming device according to the claim 31, wherein said printing unit prints location information of said transfer destinations on a sheet of paper of a size that is different from that of other pages of the print job.

33. The image forming device according to the claim 31, wherein said printing unit prints location information of said transfer destinations on a sheet of paper of a color that is different from that of other pages of the print job.

34. The image forming device according to the claim 31, wherein said printing unit prints location information of said transfer destinations on a sheet of paper with an orientation that is different from that of other pages of the print job.

35. The image forming device according to the claim 27, wherein said printing unit prints location information of said transfer destinations in a color that is different from that of other pages of the print job.

36. The image forming device according to the claim 27, wherein said printing unit prints location information of said transfer destinations adding a mark that is different from that of other pages of the print job.

37. The image forming device according to the claim 27, wherein said processor divides the received print job by page and transfers it.

38. The image forming device according to the claim 27, wherein said processor divides the received print job by number of copies and transfers it.

39. The image forming device according to the claim 26, further comprising an error detecting sensor, wherein said processor transfers a portion or all of the received print job when an error is detected.

40. The image forming device according to the claim 39, wherein the error detected by said sensor is toner emptiness.

41. The image forming device according to the claim 39, wherein the error detected by said sensor is paper emptiness.

42. The image forming device according to the claim 18, further comprising a font memory, wherein
said processor transfers a portion or all of the received print job when a font specified in the received print job is not stored in said font memory.

43. An image forming device connected to a network comprising:
an interface receiving print job;
a memory storing location information of one or more other devices connected with said device via the network;
a processor executing a process of transferring a portion of or all of the received print job to one or more transfer destinations that are included in said other devices; and
a printing unit printing location information of said transfer destinations to which the print job is transferred;
wherein said processor divides the received print job and transfers a portion of the print job obtained as a result of the division; and
said printing unit prints location information of said transfer destinations to which the print job is transferred correlatively with the page numbers of the transferred pages.

44. The image forming device according to the claim 43, wherein said processor divides the received print job and transfers a portion of the print job as a result of the division.

45. The image forming device according to the claim 44, wherein said processor divides the received print job into printable pages and non-printable pages in said image forming device, and transfers the non-printable pages among the received print job.

46. The image forming device according to the claim 44, wherein said processor divides the received print job into color image pages and monochromatic image pages, and transfers either the color pages or the monochromatic pages among the received print job.

47. The image forming device according to the claim 44, wherein
said processor divides the received print job according to page sizes, and transfers the pages of at least one size among the received print job.

48. The image forming device according to the claim 44, wherein said printing unit prints location information of said transfer destinations on a sheet of paper with one or more characteristics that are different from those of other pages of the print job.

49. The image forming device according to the claim 48, wherein said printing unit prints location information of said transfer destinations on a sheet of paper of a size that is different from that of other pages of the print job.

50. The image forming device according to the claim 48, wherein said printing unit prints location information of said transfer destinations on a sheet of paper of a color that is different from that of other pages of the print job.

51. The image forming device according to the claim 48, wherein said printing unit prints location information of said transfer destinations on a sheet of paper with an orientation that is different from that of other pages of the print job.

52. The image forming device according to the claim 44, wherein said printing unit prints location information of said transfer destinations in a color that is different from that of other pages of the print job.

53. The image forming device according to the claim 44, the wherein said printing unit prints location information of said transfer destinations adding a mark that is different from that of other pages of the print job.

54. The image forming device according to the claim 44, wherein said processor divides the received print job by page and transfers it.

55. The image forming device according to the claim 44, wherein said processor divides the received print job by number of copies and transfers it.

56. The image forming device according to the claim 43, further comprising an error detecting sensor, wherein
said processor transfers a portion or all of the received print job when an error is detected.

57. The image forming device according to the claim 56, wherein the error detected by said sensor is toner emptiness.

58. The image forming device according to the claim 56, wherein the error detected by said sensor is paper emptiness.

59. The image forming device according to the claim 43, further comprising a font memory, wherein
said processor transfers a portion or all of the received print job when a font specified in the received print job is not stored in said font memory.

60. A control method for an image forming device connected to a network comprising:
a step of receiving a print job;
a transfer step of transferring a portion or all of the received print job to one or more transfer destinations of the other devices connected with said image forming device via the network;
a step of accessing a memory, in which locations of said other devices are stored in advance, to acquire the location information of said transfer destinations to which the print job is transferred;
a printing step of causing said image forming device to print the obtained location information of said transfer destinations; and
a step of dividing the received job, wherein
said transfer step transfers a portion of the print job obtained as a result of the division; and
said printing step prints the location information, using insert printing, of said transfer destinations to which the print job is transferred in place of pages that correspond to the portion of the print job that is transferred.

61. A control method for an image forming device connected to a network comprising:
a step of receiving a print job;
a transfer step of transferring a portion or all of the received print job to one or more transfer destinations of the other devices connected with said image forming device via the network;
a step of accessing a memory, in which locations of said other devices are stored in advance, to acquire the location information of said transfer destinations to which the print job is transferred;

a printing step of causing said image forming device to print the obtained location information of said transfer destinations; and a step of dividing the received job, wherein said transfer step transfers a portion of the print job obtained as a result of the division; and said printing step prints the location information of said transfer destinations to which the print job is transferred correlatively with the page numbers of the transferred pages.

62. A computer readable medium encoded with a program product for controlling an image forming device connected to a network executing:

a procedure for receiving a print job;

a transfer procedure for transferring a portion or all of the received print job to one or more transfer destinations of the other devices connected with said image forming device via the network;

a procedure for accessing a memory, in which locations of said other devices are stored in advance, to acquire the location information of said transfer destinations to which the print job is transferred;

a printing procedure for causing said image forming device to print the obtained location information of said transfer destinations;

a procedure of dividing the received job, wherein said transfer procedure transfers a portion of the print job obtained as a result of the division; and said printing procedure prints the location information, using insert printing, of said transfer destinations to which the print job is transferred in place of pages that correspond to the portion of the print job that is transferred.

63. A computer readable medium encoded with a program product for controlling an image forming device connected to a network executing:

a procedure for receiving a print job;

a transfer procedure for transferring a portion or all of the received print job to one or more transfer destinations of the other devices connected with said image forming device via the network;

a procedure for accessing a memory, in which locations of said other devices are stored in advance, to acquire the location information of said transfer destinations to which the print job is transferred;

a printing procedure for causing said image forming device to print the obtained location information of said transfer destinations a procedure of dividing the received job, wherein said transfer procedure transfers a portion of the print job obtained as a result of the division; and said printing procedure prints the location information of said transfer destinations to which the print job is transferred correlatively with the page numbers of the transferred pages.

64. A control method for an image forming device connected to a network, the method comprising:

receiving a print job;

storing location information of one or more other devices connected with said device via the network;

executing a process of transferring a portion of or all of the received print job to one or more transfer destinations of the other devices;

printing location information of said transfer destinations to which the print job is transferred; and printing a map showing said transfer destinations to which the print job is transferred.

65. A control method for an image forming device connected to a network, the method comprising:

receiving a print job;

storing location information of one or more other devices connected with said device via the network;

executing a process of transferring a portion of or all of the received print job to one or more transfer destinations of the other devices; and printing location information of said transfer destinations to which the print job is transferred;

dividing the received print job and transferring a portion of the print job obtained as a result of the division; and printing location information, using insert printing, of said transfer destinations to which the print job is transferred in place of pages that correspond to the portion of the print job that is transferred.

66. A control method for an image forming device connected to a network comprising:

receiving a print job;

storing location information of one or more other devices connected with said device via the network;

executing a process of transferring a portion of or all of the received print job to one or more transfer destinations of the other devices;

printing location information of said transfer destinations to which the print job is transferred;

dividing the received print job and transferring a portion of the print job obtained as a result of the division; and printing location information of said transfer destinations to which the print job is transferred correlatively with the page numbers of the transferred pages.

67. A computer readable medium encoded with a program product for controlling an image forming device connected to a network executing:

receiving a print job;

storing location information of one or more other devices connected with said device via the network;

executing a process of transferring a portion of or all of the received print job to one or more transfer destinations of the other devices;

printing location information of said transfer destinations to which the print job is transferred; and printing a map showing said transfer destinations to which the print job is transferred.

68. A computer readable medium encoded with a program product for controlling an image forming device connected to a network executing:

receiving a print job;

storing location information of one or more other devices connected with said device via the network;

executing a process of transferring a portion of or all of the received print job to one or more transfer destinations of the other devices; and printing location information of said transfer destinations to which the print job is transferred;

dividing the received print job and transferring a portion of the print job obtained as a result of the division; and printing location information, using insert printing, of said transfer destinations to which the print job is transferred in place of pages that correspond to the portion of the print job that is transferred.

69. A computer readable medium encoded with a program product for controlling an image forming device connected to a network executing:

receiving a print job;

storing location information of one or more other devices connected with said device via the network;

executing a process of transferring a portion of or all of the received print job to one or more transfer destinations of the other devices;

printing location information of said transfer destinations to which the print job is transferred;

dividing the received print job and transferring a portion of the print job obtained as a result of the division; and printing location information of said transfer destinations to which the print job is transferred correlatively with the page numbers of the transferred pages.

70. A control method for an image forming device connected to a network comprising:

a step of receiving a print job;

a transfer step of transferring a portion or all of the received print job to one or more transfer destinations of the other devices connected with said image forming device via the network;

a step of accessing a memory, in which locations of said other devices are stored in advance, to acquire the location information of said transfer destinations to which the print job is transferred;

a printing step of causing said image forming device to print the obtained location information of said transfer destinations; and said printing step prints a map showing said transfer destinations to which the print job is transferred.

71. A computer readable medium encoded with a program product for controlling an image forming device connected to a network executing:

a procedure for receiving a print job;

a transfer procedure for transferring a portion or all of the received print job to one or more transfer destinations of the other devices connected with said image forming device via the network;

a procedure for accessing a memory, in which locations of said other devices are stored in advance, to acquire the location information of said transfer destinations to which the print job is transferred;

a printing procedure for causing said image forming device to print the obtained location information of said transfer destinations; and said printing step prints a map showing said transfer destinations to which the print job is transferred.

* * * * *